United States Patent
Choi et al.

(10) Patent No.: US 11,140,623 B2
(45) Date of Patent: Oct. 5, 2021

(54) DOWNLINK CONTROL CHANNEL RECEIVING METHOD AND APPARATUS FOR REDUCING POWER CONSUMPTION OF TERMINAL IN WIRELESS COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR); Taehyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 16/734,064

(22) Filed: Jan. 3, 2020

(65) Prior Publication Data
US 2020/0221379 A1 Jul. 9, 2020

(30) Foreign Application Priority Data
Jan. 3, 2019 (KR) ........................ 10-2019-0000702

(51) Int. Cl.
*H04W 52/02* (2009.01)
*H04W 72/04* (2009.01)

(52) U.S. Cl.
CPC ......... *H04W 52/02* (2013.01); *H04W 72/042* (2013.01)

(58) Field of Classification Search
CPC .... H04L 5/0044; H04L 5/0053; H04W 52/02; H04W 72/042; Y02D 30/70
(Continued)

(56) References Cited

U.S. PATENT DOCUMENTS

| 2014/0185576 A1 | 7/2014 | Lei et al. |
| 2015/0124755 A1 | 5/2015 | Gauvreau et al. |

(Continued)

FOREIGN PATENT DOCUMENTS

| WO | 2013/020292 A1 | 2/2013 |
| WO | 2019/017645 A1 | 1/2019 |

OTHER PUBLICATIONS

Catt, "Offline Discussion on UE Power Saving Schemes", 3GPP TSG RAN WG1 Meeting #95, Nov. 12-16, 2018, R1-1814327, 6 pages.
(Continued)

*Primary Examiner* — Robert J Lopata

(57) ABSTRACT

The present disclosure relates to a communication method and system for converging a 5th-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of a terminal in a wireless communication system and an apparatus for performing same. The method includes: receiving configuration information of a physical downlink control channel (PDCCH) from a base station; monitoring downlink control information (DCI) having a specific format in a slot, the monitoring based on the configuration information of the PDCCH; determining whether a number of physical downlink shared channels (PDSCHs) received based on the DCI having the specific format in the slot is a number based on a PDSCH reception capability of the terminal; and in case that the number of the PDSCHs received based on the DCI having the specific (Continued)

format is the number based on the PDSCH reception capability of the terminal, stopping monitoring DCI having the specific format in the slot.

20 Claims, 14 Drawing Sheets

(58) Field of Classification Search
USPC .......................................................... 370/311
See application file for complete search history.

(56) References Cited

U.S. PATENT DOCUMENTS

| | | |
|---|---|---|
| 2016/0014737 A1 | 1/2016 | Papasakellariou et al. |
| 2016/0192333 A1 | 6/2016 | Wang et al. |
| 2019/0254110 A1* | 8/2019 | He ........................ H04L 5/0048 |
| 2019/0306841 A1* | 10/2019 | Huang .................. H04W 76/34 |
| 2020/0008225 A1* | 1/2020 | Lee .................... H04W 72/1273 |
| 2020/0022144 A1* | 1/2020 | Papasakellariou .... H04L 5/0044 |
| 2020/0145984 A1* | 5/2020 | Hosseini ............. H04W 72/042 |
| 2020/0187177 A1* | 6/2020 | Lee ........................... H04L 5/00 |
| 2020/0344032 A1* | 10/2020 | Yang ..................... H04L 5/0094 |

OTHER PUBLICATIONS

International Search Report dated Apr. 3, 2020 in connection with International Patent Application No. PCT/KR2019/018615, 5 pages.

* cited by examiner

DOWNLINK CONTROL CHANNEL RECEIVING METHOD AND APPARATUS FOR REDUCING POWER CONSUMPTION OF TERMINAL IN WIRELESS COMMUNICATION SYSTEM

CROSS-REFERENCE TO RELATED APPLICATION

This application is based on and claims priority under 35 U.S.C. 119 to Korean Patent Application No. 10-2019-0000702 filed on Jan. 3, 2019 in the Korean Intellectual Property Office, the disclosure of which is herein incorporated by reference in its entirety.

BACKGROUND

1. Field

The disclosure relates to a method and apparatus for efficiently managing power in a wireless communication system. In addition, the disclosure relates to a downlink control channel receiving method and apparatus for reducing the power consumption of a terminal in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

In a 5G communication system, in order to reduce the power consumption of a terminal, a method for controlling whether to monitor a downlink control channel (physical downlink control channel), by using layer 1 (L1) signaling has been discussed. L1 signaling described above may include a signal (named a wake-up signal (WUS)) indicating a terminal to monitor a PDCCH, a signal (named a go-to-sleep signal (GTS)) indicating the terminal not to monitor the PDCCH, or the like. For example, a base station may transmit a WUS to a terminal, and the terminal may monitor a PDCCH from a time point at which the terminal detects the WUS. For another example, a base station may transmit a GTS to a terminal, and the terminal may not monitor a PDCCH for a particular time interval (or a preconfigured time interval) from a time point at which the terminal detects the GTS.

An aspect of various embodiments is to provide a method and apparatus for, when a particular condition (or a preconfigured condition) is satisfied regardless of physical downlink shared channel (PDSCH) reception of a terminal on the basis of various capabilities of the terminal, which are reported by the terminal to a base station, independently from a low-power mode indicator such as a WUS or a GTS, stopping PDCCH blind decoding of the terminal to prevent the power consumption of the terminal due to the PDCCH blind decoding.

An embodiment may provide a method of a terminal in a wireless communication system, the method including: receiving configuration information of a physical downlink control channel (PDCCH) from a base station; monitoring downlink control information (DCI) having a particular format (or a specific format, or a preconfigured format) in a slot, the monitoring based on the configuration information of the PDCCH; determining whether a number of physical downlink shared channels (PDSCHs) received based on the DCI having the specific format in the slot is a number based on a PDSCH reception capability of the terminal; and in case that the number of the PDSCHs received based on the DCI having the specific format is the number based on the PDSCH reception capability of the terminal, stopping monitoring DCI having the specific format in the slot.

In addition, an embodiment may provide a terminal including: a transceiver unit; and at least one processor configured to control the terminal to: receive configuration information of a physical downlink control channel (PDCCH) from a base station; monitor downlink control information (DCI) having a specific format in a slot, the monitoring based on the configuration information of the PDCCH; determine whether a number of physical downlink shared channels (PDSCHs) received based on the DCI having the specific format in the slot is a number based on a PDSCH reception capability of the terminal; and in case that the number of the PDSCHs received based on the DCI having the specific format is the number based on the PDSCH reception capability of the terminal, stop monitoring DCI having the specific format in the slot.

An embodiment can provide a method and apparatus for efficiently managing power in a wireless communication system.

Also, an embodiment can provide a downlink control channel receiving method and apparatus for reducing the power consumption of a terminal in a wireless communication system.

Also, an embodiment can minimize the power consumption of a terminal according to PDCCH monitoring by stopping PDCCH blind decoding when a specific condition is satisfied on the basis of the capability of the terminal regardless of PDSCH reception of the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
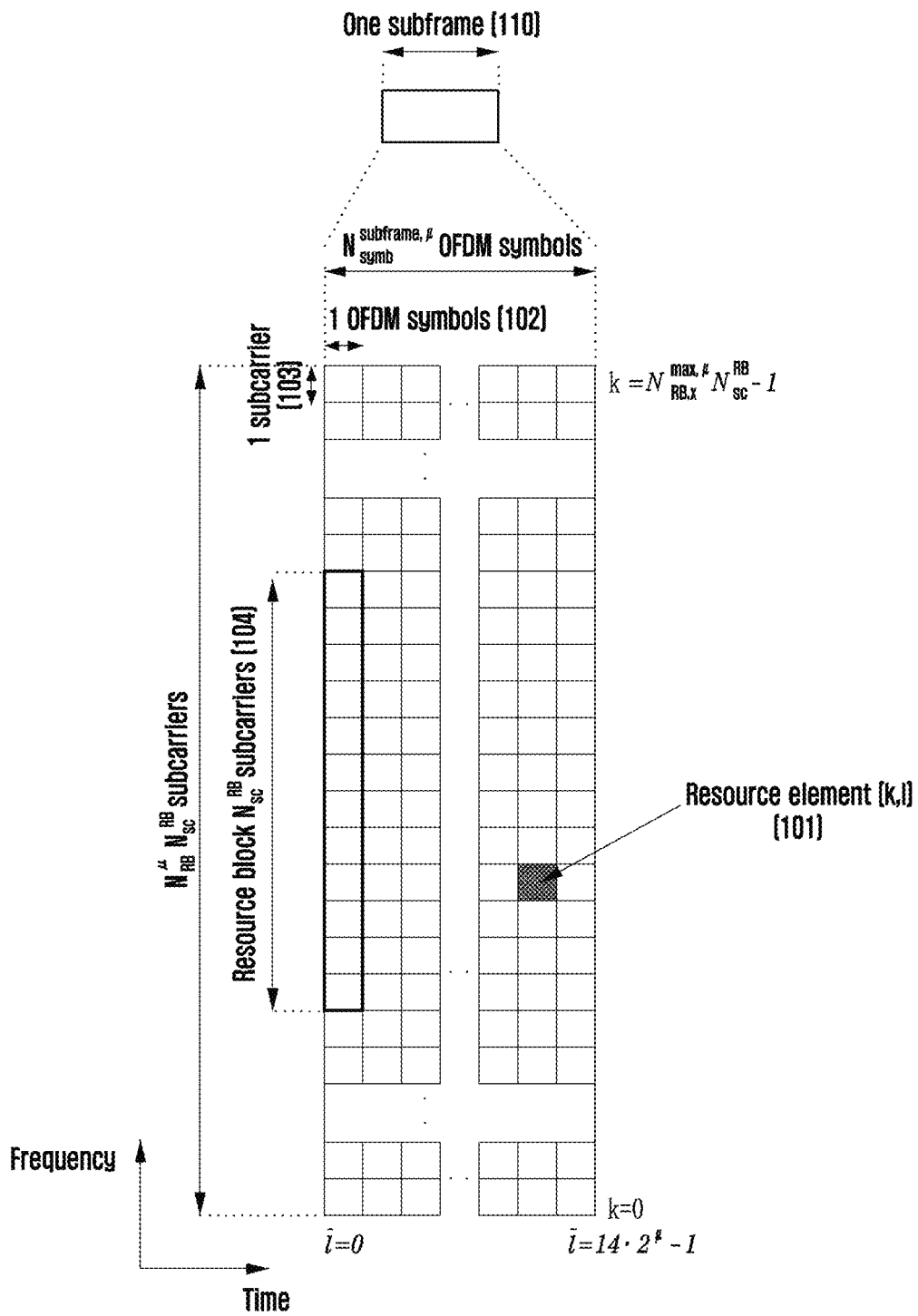
FIG. 1 illustrates a basic structure of a time-frequency domain in 5G technology according to an embodiment.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments will be described with reference to the accompanying drawings.

In the following description, a term for identifying a connection node, terms indicating network entities, terms indicating messages, a term indicating an interface between network entities, terms indicating various pieces of identification information, and the like are exemplified for convenience of explanation. Therefore, the disclosure may not be limited by the terminologies provided below, and other terms that indicate subjects having equivalent technical meanings may be used.

For convenience of description, the disclosure uses terms and names defined in a 3rd generation partnership project long term evolution (3GPP LTE) protocol. However, the disclosure may not be limited to the terms and names and may be also applied to a system following another protocol in the same way. In the disclosure, an eNB may be used together with a gNB for convenience of explanation. That is, a base station explained as an eNB may indicate a gNB.

A wireless communication system has developed to be a broadband wireless communication system that provides a high speed and high quality packet data service, like the communication standards, for example, high speed packet access (HSPA), long term evolution (LTE or evolved universal terrestrial radio access (E-UTRA)), LTE-advanced (LTE-A), and LTE-Pro of 3GPP, high rate packet data (HRPD), and ultra mobile broadband (UMB) of 3GPP2, 802.16e of IEEE, and the like, beyond the voice-based service provided at the initial stage.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). Uplink denotes a wireless link for transmitting data or a control signal by a terminal (user equipment (UE) or mobile station (MS)) to a base station (eNode B or base station (BS)), and downlink denotes a wireless link for transmitting data or a control signal by a base station to a terminal. In the multiple access schemes described above, time-frequency resources for carrying data or control information are allocated and managed in a manner to prevent overlapping of the resources between users, i.e. to establish the orthogonality, so as to identify data or control information of each user.

A future communication system after LTE, that is, a 5G communication system, is required to freely apply various requirements from a user, a service provider, and the like, and thus support a service satisfying all the various requirements. Services considered for 5G communication systems may include enhanced mobile broadband (eMBB), massive machine type communication (mMTC), ultra-reliability low-latency communication (URLLC), etc.

The purpose of eMBB is to provide a data rate enhanced more than a data rate supported by the existing LTE, LTE-A, or LTE-Pro. For example, in a 5G communication system, eMBB is required to provide a peak data rate of 10 Gbps for uplink and a peak data rate of 20 Gbps for downlink in view of a single base station. Also, the 5G communication system is required to provide the peak data rates and an increased user perceived data rate of a terminal. In order to satisfy the requirements described above, a 5G communication system requires the improvement of various transmission/reception technologies including further enhanced multi input multi output (MIMO) transmission technology. In addition, while current LTE uses, for the transmission of a signal, a maximum transmission bandwidth of 20 MHz in a band of 2 GHz used by the LTE, a 5G communication system uses a frequency bandwidth greater than 20 MHz in a frequency band of 3-6 GHz or a frequency band of 6 GHz or greater to satisfy a data rate required for the 5G communication system.

Meanwhile, in a 5G communication system, mMTC has been considered to support application services such as the Internet of Things (IoT). mMTC requires the support of massive terminal connection in a cell, the improvement of terminal coverage, improved battery life time, terminal cost reduction, etc. in order to efficiently provide the Internet of Things. Since the Internet of Things is mounted in various sensors and devices to provide communication functions, mMTC is required to support a large number of terminals (e.g. 1,000,000 terminals/km$^2$) in a cell. Also, a terminal supporting mMTC requires a wider coverage compared to other services provided in a 5G communication system because the terminal is highly probable, due to the nature of mMTC, to be disposed in a radio shadow area such as the basement of a building, which a cell fails to cover. A terminal supporting mMTC is required to be inexpensive and have a very long battery life time, like 10-15 years, because it is hard to often change the battery of the terminal.

Lastly, URLLC is a cellular-based wireless communication service which is used for a particular purpose (mission-critical). For example, services used in remote control for robot or machinery, industrial automation, unmanned aerial vehicle, remote health care, emergency alert, etc. may be considered for URLLC. Therefore, communication provided by URLLC is required to provide very low latency and very high reliability. For example, a service supporting URLLC is required to satisfy a wireless connection latency time (air interface latency) smaller than 0.5 milliseconds and a packet error rate of $10^{-5}$ or smaller at the same time. Therefore, for services supporting URLLC, a 5G system requires a design for providing a transmission time interval (TTI) shorter than those of other services and allocating a wide domain of resources in a frequency band to secure the reliability of a communication link.

Three services of 5G technology, that is, eMBB, URLLC, and mMTC may be multiplexed and then transmitted in a single system. In order to satisfy different requirements of the services, different transmission/reception schemes and different transmission/reception parameters may be used for the services, respectively.

Hereinafter, a frame structure of a 5G system will be described in detail with reference to the drawings.

FIG. 1 illustrates a basic structure of a time-frequency domain which is a wireless resource domain in which data or control channel is transmitted, in a 5G system according to an embodiment.

In FIG. 1, the transverse axis indicates a time domain, and the longitudinal axis indicates a frequency domain. In the time-frequency domain, a basic unit of a resource may be defined as a resource element (RE) 101, that is, one orthogonal frequency division multiplexing (OFDM) symbol 102 in a time axis and one subcarrier (103) in a frequency axis. In the frequency domain, $N_{sc}^{RB}$ number (e.g. 12) of consecutive REs may configure a single resource block (RB) 104. A subframe (110) may be defined as 1 ms and may include a plurality of symbols.

Figure 2:
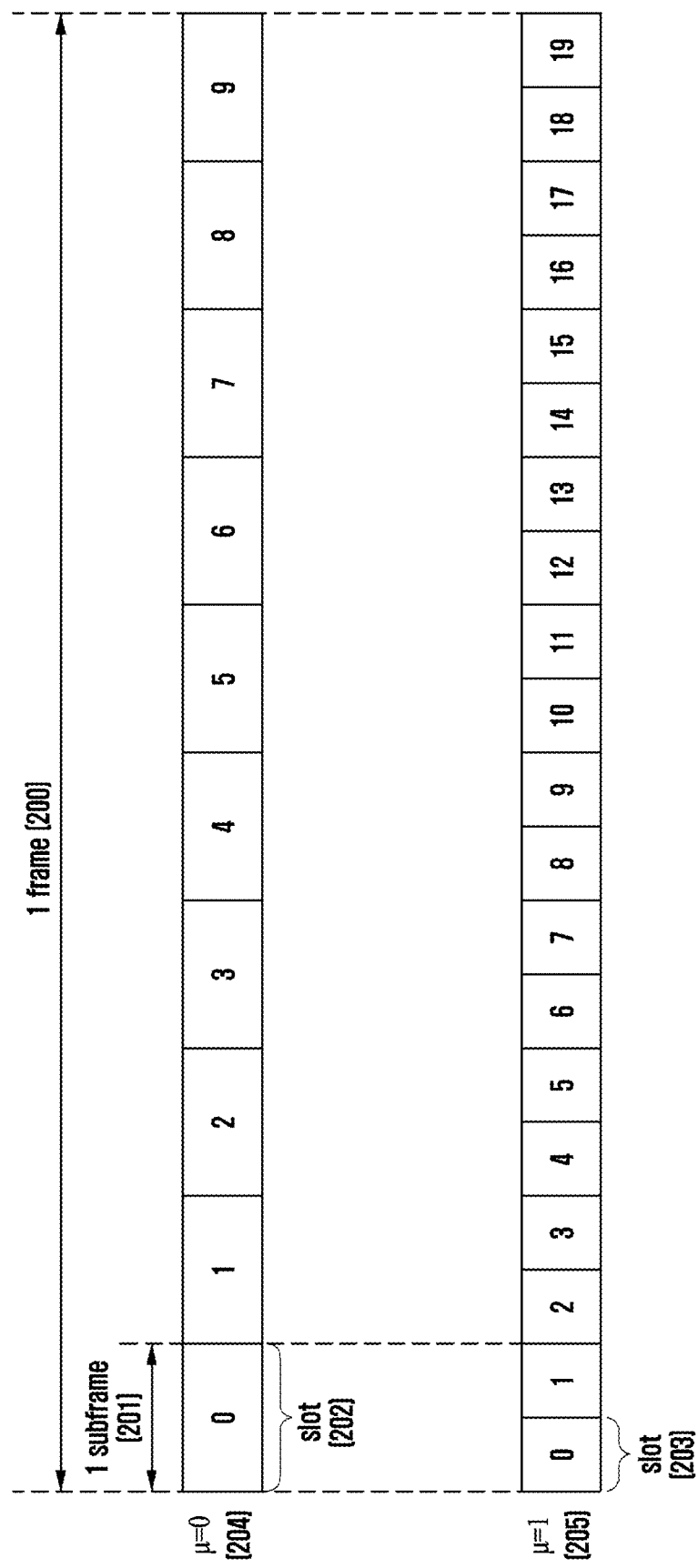
FIG. 2 illustrates a structure of a frame, a subframe, and a slot in 5G technology according to an embodiment.

FIG. 2 illustrates a slot structure considered in a 5G system according to an embodiment.

FIG. 2 illustrates an example of a structure of a frame 200, a subframe 201, and a slot 202. One frame 200 may be defined as 10 ms. One subframe 201 may be defined as 1 ms, and thus one frame 200 may be configured by a total of 10 subframes 201. One slot 202 or 203 may be defined as 14 OFDM symbols (i.e. the number of symbols per one slot ($N_{symb}^{slot}$)=14). One subframe 201 may be configured by one slot 202 or a plurality of slots 203, and the number of slots 202 or 203 per one subframe 201 may be different according to a configuration value t 204 or 205 of a subcarrier spacing. FIG. 2 illustrates an example in which a subcarrier spacing configuration value μ is 0 (the case indicated by reference numeral 204), and a subcarrier spacing configuration value μ is 1 (the case indicated by reference numeral 205). In case that t is 0 (204, the case where a subcarrier spacing is 15 kHz), one subframe 201 may be configured by one slot 202, and in case that μ is 1 (205, the case where a subcarrier spacing is 30 kHz), one subframe 201 may be configured by two slots 203. That is, the number ($N_{slot}^{subframe,\mu}$) of slots per one subframe may be different according to a configuration value μ of a subcarrier spacing, and according thereto, the number ($N_{slot}^{subframe,\mu}$) of slots per one frame may be different. $N_{slot}^{subframe,\mu}$ and $N_{slot}^{subframe,\mu}$, according to each subcarrier spacing configuration μ may be defined as shown in table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a configuration of a bandwidth part (BWP) in a 5G communication system will be described in detail with reference to FIG. 3.

Figure 3:
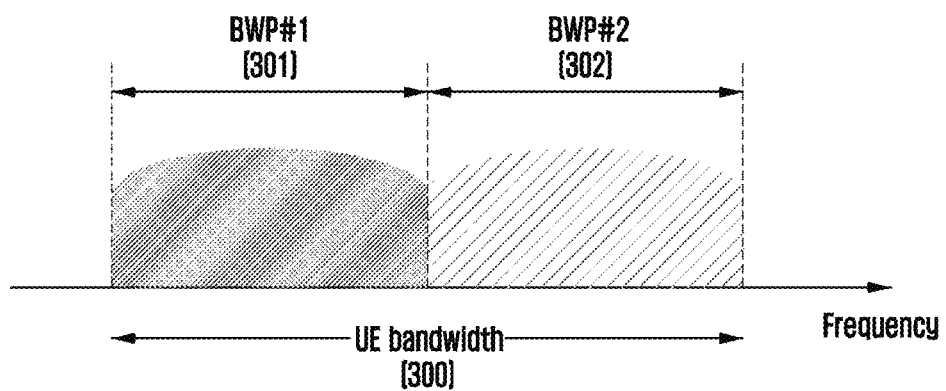
FIG. 3 illustrates an example of a configuration of a bandwidth part in 5G technology according to an embodiment.

FIG. 3 illustrates an example of a configuration of a bandwidth part in a 5G communication system according to an embodiment.

FIG. 3 illustrates an example in which a terminal bandwidth 300 is configured to be divided into two bandwidth parts, that is, bandwidth part #1 301 and bandwidth part #2 302. A base station may configure one bandwidth part or a plurality of bandwidth parts for a terminal and may configure the following information for each bandwidth part.

In addition to configuration information described above, various parameters related to a bandwidth part may be configured for the terminal. The information may be transferred by the base station to the terminal through higher layer signaling, for example, radio resource control (RRC) signaling. At least one bandwidth part among the configured one bandwidth part or plurality of bandwidth parts may be activated. Whether the configured bandwidth part is activated may be dynamically transferred through downlink control information (DCI) or semi-statically transferred through RRC signaling by the base station to the terminal.

An initial bandwidth part (BWP) for an initial connection may be configured for the terminal before RRC connection through a master information block (MIB) by the base station. More specifically, the terminal may receive, through an MIB and in an initial connection stage, configuration information relating to a search space and a control region (control resource set; CORESET) in which a PDCCH for receiving system information (the information may correspond to remaining system information (RMSI) or system information block 1 (SIB1)) required for an initial connection can be transmitted. Each of the control resource set and the search space configured by the MIB may be considered to be identifier (ID) 0. The base station may notify the terminal of configuration information such as frequency assignment information, time assignment information, numerology, etc. of control resource set #0 through an MIB. Also, the base station may notify, through an MIB, the terminal of configuration information of a monitoring period and a monitoring occasion of control resource set #0, that is, configuration information of search space #0. The terminal may consider, as an initial bandwidth part for the initial connection, a frequency domain configured by control resource set #0 obtained from the MIB. An identifier (ID) of the initial bandwidth part may be considered to be 0.

The bandwidth part configuration supported by 5G technology may be used for various purposes.

For example, in case that a bandwidth supported by the terminal is smaller than a system bandwidth, the bandwidth may be supported through a bandwidth part configuration. For example, the frequency location of a bandwidth part is configured for the terminal so that the terminal can transmit or receive data at a particular frequency (or a preconfigured frequency) location in a system bandwidth.

For another example, the base station may configure a plurality of bandwidth parts for a terminal in order to support different numerologies. For example, in order to support, to a terminal, both data transmission/reception using a subcarrier spacing of 15 KHz and data transmission/reception using a subcarrier spacing of 30 KHz, two bandwidth parts may be configured to have a subcarrier spacing of 15 KHz and a subcarrier spacing of 30 KHz, respectively. Different

TABLE 2

```
BWP ::=                              SEQUENCE {
    bwp-Id                               BWP-Id,
    (bandwidth part identifier)
    locationAndBandwidth                 INTEGER (1..65536),
    (the location of the bandwidth part)
    subcarrierSpacing                    ENUMERATED {n0, n1, n2, n3, n4, n5},
    (subcarrier spacing)
    cyclicPrefix                         ENUMERATED { extended }
    (cyclic prefix)
}
``` bandwidth parts may be subjected to frequency division multiplexing, and in case that data is to be transmitted or received using a particular subcarrier spacing, a bandwidth part configured to have the subcarrier spacing may be activated.

For another example, the base station may configure bandwidth parts having different bandwidths for the terminal in order to reduce the power consumption of the terminal. For example, in case that the terminal supports a very wide bandwidth, e.g., a bandwidth of 100 MHz, and always transmits or receives data through the bandwidth, the terminal may consume a very large quantity of power. Particularly, unnecessary monitoring of a downlink control channel in a large bandwidth of 100 MHz under no traffic is very inefficient in view of power consumption. In order to reduce the power consumption of a terminal, the base station may configure a bandwidth part having a relatively small bandwidth, for example, a bandwidth part having 20 MHz for the terminal. In case that there is no traffic, the terminal may monitor a 20 MHz bandwidth part, and in case that data is generated, the terminal may transmit or receive the data with a 100 MHz bandwidth part according to an indication of the base station.

In relation to a method for configuring the bandwidth part, terminals before RRC-connected may receive configuration information of an initial bandwidth part through a master information block (MIB) and/or SIB in an initial connection stage. More specifically, a control resource set (CORESET) for a downlink control channel through which downlink control information (DCI) scheduling a system information block (SIB) can be transmitted may be configured for the terminal through an MIB of a physical broadcast channel (PBCH). The bandwidth of the control resource set configured by the MIB may be considered as an initial bandwidth part, and the terminal may receive a PDSCH through which the SIB is transmitted, through the configured initial bandwidth part. An initial bandwidth part may be used for other system information (OSI), paging, and random access in addition to the reception of a SIB. In case that configuration information of an initial bandwidth part is included in a SIB received based on an MIB, the initial bandwidth part may be configured based on the SIB.

In the following description, a synchronization signal (SS)/PBCH block in 5G technology will be described.

A SS/PBCH block means a physical layer channel block including a primary SS (PSS), a secondary SS (SSS), and a PBCH and the specific structure thereof is described below.
- PSS: indicates a signal serving as a reference for downlink time/frequency synchronization and provides a part of information of a cell ID.
- SSS: is a reference for downlink time/frequency synchronization and provides the remaining cell ID information which a PSS does not provide. Additionally, the SSS may serve as a reference signal for demodulating a PBCH.
- PBCH: provides necessary system information required for transmitting or receiving a data channel and a control channel by a terminal. The necessary system information may include search space-related control information indicating wireless resource mapping information of a control channel, and scheduling control information of a separate data channel for transmitting system information.
- SS/PBCH block: a SS/PBCH block includes a combination of a PSS, a SSS, and a PBCH. One SS/PBCH block or a plurality of SS/PBCH blocks may be transmitted within 5 ms, and each of transmitted SS/PBCH blocks may be distinguished from each other by its index.

The terminal may detect the PSS and the SSS and decode the PBCH in the initial connection stage. An MIB may be obtained from the PBCH and control resource set #0 may be configured from the MIB. The terminal may monitor control resource set #0 under the assumption that a selected SS/PBCH block and a DMRS transmitted on the control resource set #0 are in a quasi-co-location (QCL). The terminal may receive system information through downlink control information transmitted on control resource set #0. The terminal may obtain configuration information relating to a random access channel (RACH) required for an initial connection from the received system information. The terminal may transmit a physical RACH (PRACH) to the base station in consideration of an SS/PBCH index selected by the terminal itself, and the base station having received the PRACH may obtain information on the SS/PBCH block index selected by the terminal, from the PRACH. From the information, the base station may identify a block which the terminal selects among SS/PBCH blocks, and the fact that the terminal monitors control resource set #0 associated with the selected block.

In the following description, downlink control information (DCI) in a 5G system will be explained in detail.

In a 5G system, scheduling information on uplink data (or physical uplink data channel (physical uplink shared channel, PUSCH)) or downlink data (or physical downlink data channel (physical downlink shared channel, PDSCH)) is transferred through DCI from a base station to a terminal. The terminal may monitor a fallback DCI format and a non-fallback DCI format for a PUSCH or a PDSCH. The fallback DCI format may be configured by a fixed field pre-defined between a base station and a terminal, and the non-fallback DCI format may include a configurable field.

The DCI may be subjected to a channel coding and modulation procedure, and then transmitted through a physical downlink control channel (PDCCH). A cyclic redundancy check (CRC) is attached to a DCI message payload, and the CRC is scrambled by a radio network temporary identifier (RNTI) corresponding to the identity of the terminal. Different types of RNTIs are used according to the purpose of a DCI message, for example, UE-specific data transmission, a power control command, a random access response, or the like. That is, a RNTI is not explicitly transmitted, and is transmitted after being included in a CRC calculation procedure. In case that a DCI message transmitted on a PDCCH is received, the terminal may identify a CRC by using an allocated RNTI, and in case that a CRC identification result indicates matching of the RNTI, the terminal may identify that the message has been transmitted to the terminal.

For example, DCI scheduling a PDSCH for system information (SI) may be scrambled by a SI-RNTI. DCI scheduling a PDSCH for a random access response (RAR) message may be scrambled by a RA-RNTI. DCI scheduling a PDSCH for a paging message may be scrambled by a P-RNTI. DCI notifying a slot format indicator (SFI) may be scrambled by a SFI-RNTI. DCI notifying a transmit power control (TPC) may be scrambled by a TPC-RNTI. DCI scheduling a UE-specific PDSCH or PUSCH may be scrambled by a cell RNTI (C-RNTI).

DCI format 0_0 may be used for fallback DCI scheduling a PUSCH, and in this case, a CRC may be scrambled by a C-RNTI. DCI format 0_0 having a CRC scrambled by a C-RNTI may include, for example, the following information.

TABLE 3

Identifier for DCI formats (DCI format identifier) - [1] bit
Frequency domain resource assignment -[⌈log$_2$(N$_{RB}^{UL, BWP}$(N$_{RB}^{UL, BWP}$ + 1)/2)⌉] bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH (wherein TPC indicates transmit power control) - [2] bits
UL/SUL indicator (uplink/supplementary uplink indicator) - 0 or 1 bit DCI format 0_1 may be used for non-fallback DCI scheduling a PUSCH, and in this case, a CRC may be scrambled by a C-RNTI. DCI format 0_1 having a CRC scrambled by a C-RNTI may include, for example, the following information.

TABLE 4

Carrier indicator-0 or 3 bits
UL/SUL indicator-0 or 1 bit
Identifier for DCI formats-[1] bit
Bandwidth part indicator-0, 1 or 2 bits
Frequency domain resource assignment
For resource allocation type 0, ⌈N$_{RB}^{UL,BWP}$/P⌉ bits
For resource allocation type 1, ⌈log$_2$(N$_{RB}^{UL,BWP}$(N$_{RB}^{UL,BWP}$ + 1)/2)⌉ bits
Time domain resource assignment-1, 2, 3, or 4 bits
VRB-to-PRB mapping (mapping between virtual resource block and physical resource block)-0 or 1 bit, only for resource allocation type 1.
0 bits if only resource allocation type 0 is configured;
1 bit otherwise.
Frequency hopping flag-0 or 1 bit, only for resource allocation type 1.
0 bits if only resource allocation type 0 is configured;
1 bit otherwise.
Modulation and coding scheme-5 bits
New data indicator-1 bit
Redundancy version-2 bits
HARQ process number-4 bits
1st downlink assignment index-1 or 2 bits
1 bit for semi-static HARQ-ACK codebook;
2 bits for dynamic HARQ-ACK codebook with single HARQ-ACK codebook.
2nd downlink assignment index-0 or 2 bits
2 bits for dynamic HARQ-ACK codebook with two HARQ-ACK sub-codebooks;
0 bits otherwise.
TPC command for scheduled PUSCH-2 bits SRS resource indicator - $\left\lceil \log_2\left(\sum_{k=1}^{L_{max}} \binom{N_{SRS}}{k}\right) \right\rceil$ or ⌈log$_2$(N$_{SRS}$)⌉ bits $\left\lceil \log_2\left(\sum_{k=1}^{L_{max}} \binom{N_{SRS}}{k}\right) \right\rceil$ bits for non-codebook based PUSCH transmission(if PUSCH transmission is not based on codebook);
⌈log$_2$(N$_{SRS}$)⌉ bits for codebook based PUSCH transmission(if PUSCH transmission is based on codebook).
Precoding information and number of layers-up to 6 bits
Antenna ports-up to 5 bits
SRS request-2 bits
CSI request (wherein CSI indicates channel state information)-0, 1, 2, 3, 4,5, or 6 bits
CBG transmission information (wherein CBG indicates code block group)-0, 2, 4, 6, or 8 bits
PTRS-DMRS association (wherein PTRS indicates phase tracking reference signal and DMRS indicates demodulation reference signal)- 0 or 2 bits.
beta_offset indicator-0 or 2 bits
DMRS sequence initialization (wherein DMRS indicates demodulation reference signal)-0 or 1 bit DCI format 1_0 may be used for fallback DCI scheduling a PDSCH, and in this case, a CRC may be scrambled by a C-RNTI. DCI format 1_0 having a CRC scrambled by a C-RNTI may include, for example, the following information.

TABLE 5

Identifier for DCI formats - [1] bit
Frequency domain resource assignment -[⌈log$_2$(N$_{RB}^{DL, BWP}$(N$_{RB}^{DL, BWP}$ + 1)/2)⌉] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator (wherein PUCCH indicates physical uplink control channel) - 3 bits
PDSCH-to-HARQ feedback timing indicator - [3] bits DCI format 1_1 may be used for non-fallback DCI scheduling a PDSCH, and in this case, a CRC may be scrambled by a C-RNTI. DCI format 1_1 having a CRC scrambled by a C-RNTI may include, for example, the following information.

TABLE 6

Carrier indicator - 0 or 3 bits
Identifier for DCI formats - [1] bits
Bandwidth part indicator - 0, 1 or 2 bits
Frequency domain resource assignment
For resource allocation type 0, ⌈N$_{NRB}^{DL, BWP}$/P⌉ bits
For resource allocation type 1, [⌈log$_2$ (N$_{RB}^{DL, BWP}$ (N$_{RB}^{DL, BWP}$ + 1)/2)⌉] bits
Time domain resource assignment -1, 2, 3, or 4 bits
VRB-to-PRB mapping - 0 or 1 bit, only for resource allocation type 1.
0 bits if only resource allocation type 0 is configured;
1 bit otherwise.
PRB bundling size indicator (wherein PRB indicates physical resource block) - 0 or 1 bit
Rate matching indicator - 0, 1, or 2 bits
ZP CSI-RS trigger (wherein ZP CSI-RS indicates zero power channel state information-reference signal) - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information (where CBG indicates code block group) - 0 or 1 bit
DMRS sequence initialization - 1 bit The DCI message payload sizes (A) of DCI format 0_0 and DCI format 1_0 are the same as those of DCI format 2_2 and DCI format 2_3 described in the following description. The DCI message payload sizes of DCI format 0_1 and DCI format 1_1, and DCI format 2_0 and DCI format 2_1 described in the following description may be configured to be different by the base station. That is, in case that the DCI message payload size of DCI format 0_1 is B, the DCI message payload size of DCI format 1_1 is C, the DCI message payload size of DCI format 2_0 is D, and the DCI message payload size of DCI format 2_1 is E, it is possible that A, B, C, D, and E are configured to be all different. Therefore, the terminal may monitor DCI formats under the assumption of a maximum of five different DCI message payload sizes A, B, C, D, and E. Therefore, in case that the terminal monitors DCI formats having all the DCI message payload sizes, the power consumption due to blind decoding is increased, and in case that the terminal can stop monitoring for a DCI format having a specific DCI message payload size proposed in an embodiment, it is possible to prevent the power consumption due to the monitoring.

In the following description, a downlink control channel in a 5G communication system will be explained in more detail with reference to the drawings.

Figure 4:
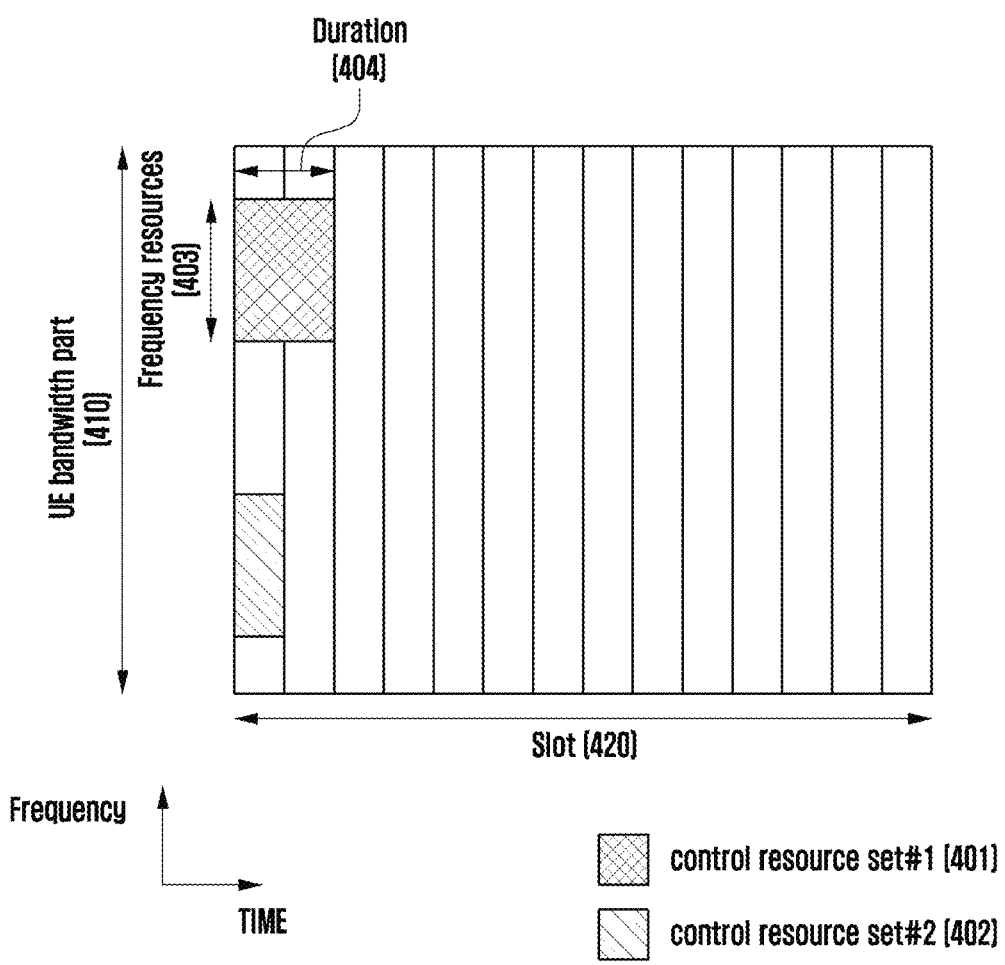
FIG. 4 illustrates an example of a configuration of a control resource set of a downlink control channel in 5G technology according to an embodiment.

FIG. 4 illustrates an example of a control resource set (CORESET) on which a downlink control channel is transmitted, in a 5G wireless communication system according to an embodiment. FIG. 4 shows an example in which a bandwidth part 410 of a terminal is configured along a frequency axis and two control resource sets (control resource set #1 401 and control resource set #2 402) are configured in one slot 420 along a time axis. The control resource sets 401 and 402 may be configured on particular frequency resources 403 in the entire terminal bandwidth part 410 along the frequency axis. One OFDM symbol or a plurality of OFDM symbols may be configured along the time axis, and the configured OFDM symbol or symbols may be defined as a control resource set duration 404. In the example illustrated in FIG. 4, control resource set #1 401 is configured to have a control resource set duration of two symbols, and control resource set #2 402 is configured to have a control resource set duration of one symbol.

A control resource set in 5G technology, described above may be configured for a terminal by a base station through higher layer signaling (e.g. system information, master information block (MIB), and radio resource control (RRC) signaling). Configuring a control resource set for a terminal means providing information such as a control resource set identifier, the frequency location of the control resource set, the symbol length of the control resource set, etc. For example, the information may include the following information.

TABLE 7

| | |
|---|---|
| ControlResourceSet ::= | SEQUENCE { |
| -- Corresponds to L1 parameter 'CORESET-ID' | |
| controlResourceSetId | ControlResourceSetId, |
| (control resource set identifier(Identity)) | |
| frequencyDomainResources | BIT STRING (SIZE (45)), |
| (frequency axis resource assignment information) | |
| duration | INTEGER (1..maxCoReSetDuration), |
| (time axis resource assignment information) | |
| cce-REG-MappingType | CHOICE { |
| (CCE-to-REG mapping scheme) | |
|   interleaved | SEQUENCE{ |
|     reg-BundleSize | ENUMERATED {n2, n3, n6}, |
|   (REG bundle size) | |
|     precoderGranularity | ENUMERATED |
| {sameAsREG-bundle, allContiguousRBs}, | |
|     interleaverSize | ENUMERATED {n2, n3, n6} |
|   (interleaver size) | |
|     shiftIndex | |
|     INTEGER(0..maxNrofPhysicalResourceBlocks-1) | |
|   (interleaver shift) | |
|   }, | |
|   nonInterleaved | NULL |
| }, | |
| tci-StatesPDCCH | SEQUENCE(SIZE |
| (1..maxNrofTCI-StatesPDCCH)) OF TCI-StateId | OPTIONAL, |
| (QCL configuration information) | |
| tci-PresentInDCI | ENUMERATED {enabled} |
| } | |

The tci-StatesPDCCH (simply referred to as TCI state) configuration information shown in table 7 may include information on the index or indices of one synchronization signal (SS)/physical broadcast channel (PBCH) block or a plurality of SS/PBCH blocks which are in a quasi-co-located (QCL) relationship with a DMRS transmitted on a corresponding control resource set, or information on the index of a channel state information reference signal (CSI-RS).

Figure 5:
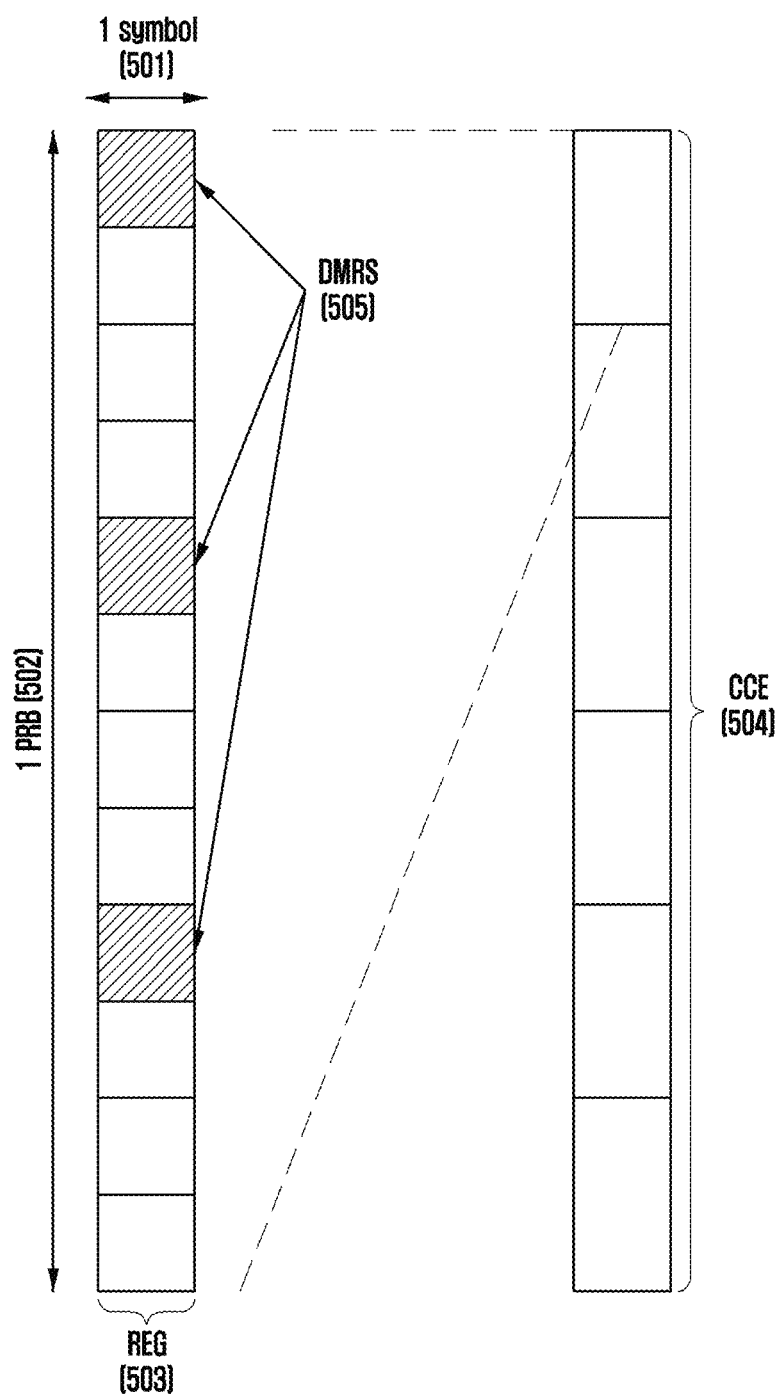
FIG. 5 illustrates a structure of a downlink control channel in 5G technology according to an embodiment.

FIG. 5 illustrates an example of a basic unit of time and frequency resources configuring a downlink control channel, which can be used in 5G technology according to an embodiment. As illustrated in FIG. 5, a basic unit of time and frequency resources configuring a control channel is named a resource element group (REG) 503, and the REG 503 may be defined as one OFDM symbol 501 in a time axis and one physical resource block (PRB) 502 in a frequency axis, that is, 12 subcarriers. The REGs 503 may be connected and attached to each other to configure a downlink control channel assignment unit.

As illustrated in FIG. 5, in case that a basic unit for the assignment of a downlink control channel in 5G technology is a control channel element (CCE) 504, one CCE 504 may be configured by a plurality of the REGs 503. For example, the REG 503 illustrated in FIG. 5 may be configured by 12 REs, and in case that one CCE 504 is configured by six REGs 503, the one CCE 504 may be configured by 72 REs. In case that a downlink control resource set is configured, the resource set may be configured by a plurality of CCEs 504, and a particular downlink control channel may be transmitted after being mapped to one CCE 504 or a plurality of CCEs 504 according to an aggregation level (AL) in the resource control set. CCEs 504 in a control resource set are distinguished by numbers, and the number may be assigned according to a logical mapping scheme.

The basic unit of a downlink control channel, illustrated in FIG. 5, that is, an REG 503, may include REs to which DCI is mapped and an area to which a DMRS 505 which is a reference signal for decoding the REs is mapped. As illustrated in FIG. 5, three DMRSs 505 may be transmitted in one REG 503.

The number of CCEs required for transmitting a PDCCH may be 1, 2, 4, 8, and 16 according to aggregation levels (ALs), and different numbers of CCEs may be used to implement the link adaptation of the downlink control channel. For example, in case that AL=L, one downlink control channel may be transmitted through L number of CCEs. A terminal is required to detect a signal in the state where the terminal does not know exact location information and an AL of a downlink control channel, and a search space indicating a set of CCEs is defined for blind decoding. A search space is a set of downlink control channel candidates configured by CCEs to which the terminal is required to attempt to decode at a given aggregation level, and since there are various aggregation levels grouping 1, 2, 4, 8, and 16 CCEs, respectively, the terminal has a plurality of search spaces. A search space set may be defined to be a set of search spaces at all the configured aggregation levels.

Search spaces may be classified into a common search space and a UE-specific search space. A particular group of terminals or all the terminals may investigate a common search space of a PDCCH to receive cell-common control information such as a paging message or dynamic scheduling for system information. For example, the terminals may investigate a common search space of a PDCCH to receive PDSCH scheduling assignment information for transmission of a SIB including cell operator information. In the case of a common search space, a particular group of terminals or all the terminals are required to receive a PDCCH, and thus the common search space may be defined to be a pre-promised CCE set. Scheduling assignment information for a UE-specific PDSCH or PUSCH may be received by investigating a UE-specific search space of a PDCCH. A UE-specific search space may be defined UE-specifically by using the identity of a terminal and various system parameter functions.

In 5G technology, a parameter of a search space for a PDCCH may be configured for a terminal by a base station through higher layer signaling (e.g. SIB, MIB, and RRC signaling). For example, the base station may configure, for the terminal, the number of PDCCH candidate groups at each aggregation level L, a search space monitoring period, a search space monitoring occasion in the units of symbols in a slot, search space type (common search space or UE-specific search space), a combination of an RNTI and a DCI format to be monitored in a corresponding search space, and a control resource set index for search space monitoring. For example, the parameters may include the following information.

TABLE 8

```
SearchSpace ::=                              SEQUENCE {
    -- Identity of the search space. SearchSpaceId = 0 identifies the SearchSpace
configured via PBCH (MIB) or ServingCellConfigCommon.
        searchSpaceId                        SearchSpaceId,
        (search space identifier)
        controlResourceSetId                 ControlResourceSetId,
        (control resource set identifier)
        monitoringSlotPeriodicityAndOffset   CHOICE {
        (monitoring slot level period)
            sl1                              NULL,
            sl2                              INTEGER (0..1),
            sl4                              INTEGER (0..3),
            sl5                              INTEGER (0..4),
            sl8                              INTEGER (0..7),
            sl10                             INTEGER (0..9),
            sl16                             INTEGER (0..15),
            sl20                             INTEGER (0..19)
        }
        duration(monitoring duration)           INTEGER (2..2559)
        monitoringSymbolsWithinSlot             BIT STRING (SIZE (14))
        (monitoring symbols in slot)
        nrofCandidates                       SEQUENCE {
        (the number of PDCCH candidate groups for each aggregation level)
            aggregationLevel1                ENUMERATED {n0, n1, n2, n3,
n4, n5, n6, n8},
            aggregationLevel2                ENUMERATED {n0, n1, n2, n3,
n4, n5, n6, n8},
            aggregationLevel4                ENUMERATED {n0, n1, n2, n3,
n4, n5, n6, n8},
            aggregationLevel8                ENUMERATED {n0, n1, n2, n3,
n4, n5, n6, n8},
            aggregationLevel16               ENUMERATED {n0, n1, n2, n3,
n4, n5, n6, n8}
        },
        searchSpaceType                      CHOICE {
        (search space type)
            -- Configures this search space as common search space (CSS) and DCI
            formats to monitor.
            common                           SEQUENCE {
        (common search space)
            }
            ue-Specific                      SEQUENCE {
        (UE-specific search space)
```

TABLE 8-continued

-- Indicates whether the UE monitors in this USS for DCI formats 0-0 and 1-0 or for formats 0-1 and 1-1.
      formats                                              ENUMERATED {formats0-0-And-1-0, formats0-1-And-1-1},

...
}

The base station may configure one search space set or a plurality of search space sets for the terminal according to the configuration information. For example, the base station may configure, for the terminal, search space set 1 and search space set 2, in search space set 1, DCI format A scrambled by X-RNTI may be configured to be monitored in a common search space, and in search space set 2, DCI format B scrambled by Y-RNTI may be configured to be monitored in a UE-specific search space.

According to the configuration information, one search space set or a plurality of search space sets may exist in a common search space or a UE-specific search space. For example, search space set #1 and search space set #2 may be configured to be common search spaces, and search space set #3 and search space set #4 may be configured to be UE-specific search spaces.

In a common search space, the following combinations of a DCI format and a RNTI may be monitored.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In a UE-specific search space, the following combinations of a DCI format and a RNTI may be monitored.

DCI format 0_0/0_1 with CRC scrambled by C-RNTI, CS-RNTI, TC-RNTI

DCI format 1_0/1_1 with CRC scrambled by C-RNTI, CS-RNTI, TC-RNTI

The described types of RNTIs may follow the definitions and purposes below.

Cell RNTI (C-RNTI): UE-specific PDSCH scheduling purpose

Temporary Cell RNTI (TC-RNTI): UE-specific PDSCH scheduling purpose

Configured Scheduling RNTI (CS-RNTI): semi-statically configured UE-specific PDSCH scheduling purpose Random Access RNTI (RA-RNTI): the purpose of scheduling a PDSCH in a random access stage Paging RNTI (P-RNTI): the purpose of scheduling a PDSCH on which paging is transmitted System Information RNTI (SI-RNTI): the purpose of scheduling a PDSCH on which system information is transmitted Interruption RNTI (INT-RNTI): the purpose of notifying of whether a PDSCH is punctured Transmit Power Control for PUSCH RNTI (TPC-PUSCH-RNTI): the purpose of indicating a power control command for a PUSCH Transmit Power Control for PUCCH RNTI (TPC-PUCCH-RNTI): the purpose of indicating a power control command for a PUCCH Transmit Power Control for SRS RNTI (TPC-SRS-RNTI): the purpose of indicating a power control command for a SRS The described DCI formats may follow the definitions below.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G technology, a search space of aggregation level L in control resource set p and search space set s may be expressed as in equation 1 below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 1]}$$

L: aggregation level $n_{CI}$: carrier index $N_{CCE,p}$: the total number of CCEs existing in control resource set p $n_{s,f}^{\mu}$: slot index $M_{p,s,max}^{(L)}$: the number of PDCCH candidate groups of aggregation level L $m_{s,n_{CI}}=0, \ldots, M_{p,s,max}^{(L)}-1$: the indice of PDCCH candidate groups of aggregation level L $i=0, \ldots, L-1$ $Y_{p,n_{s,f}^{\mu}}=(A_p \cdot Y_{p,n_{s,f}^{\mu}-1}) \bmod D$, $Y_{p,-1}=n_{RNTI} \neq 0$, $A_0=39827$, $A_1=39829$, $A_2=39839$, $D=65537$ $n_{RNTI}$: terminal identifier In a case of a common search space, $Y\_(p,n_{s,f}^{\mu})$ may be 0.

In a case of a UE-specific search space, $Y\_(p,n_{s,f}^{\mu})$ may be changed according to a time index and the identity (C-RNTI or ID configured for a terminal by a base station) of a terminal.

In 5G technology, a plurality of search space sets may be configured by different parameters (e.g. the parameters in table 8), and thus a set of search space sets monitored by a terminal may be changed at every time point.

Figure 6:
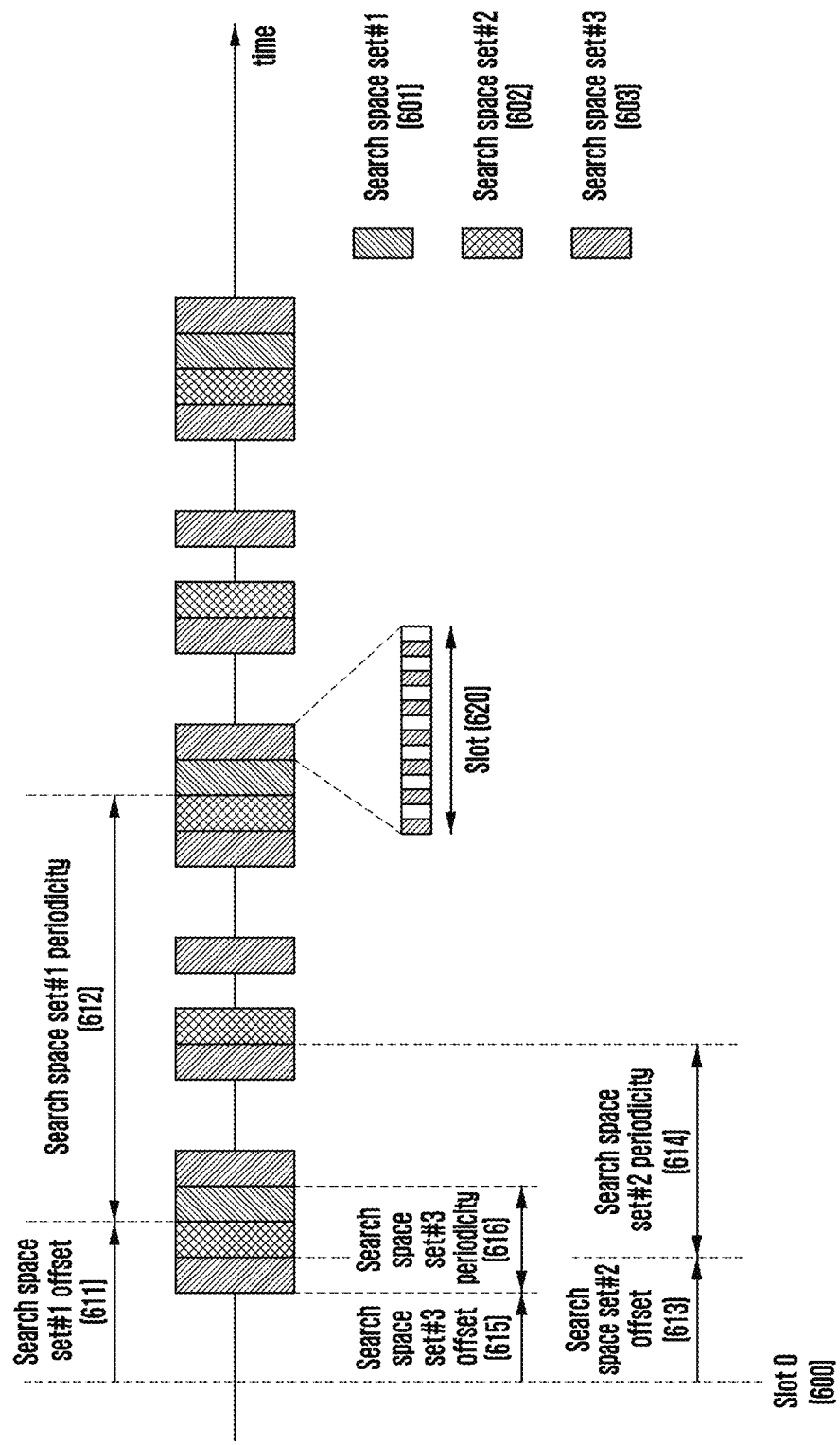
FIG. 6 illustrates a configuration of search space sets for monitoring a downlink control channel in 5G technology according to an embodiment.

FIG. 6 illustrates a configuration of search space sets for monitoring a downlink control channel in 5G technology according to an embodiment.

In FIG. 6, search space set #1 601 is configured to have an offset 611 and a period 612 starting from slot 0 600, search space set #2 602 is configured to have an offset 613 and a period 614 starting from the slot 0 600, and search space set #3 603 is configured to have an offset 615 and a period 616 starting from the slot 0 600. In case that the offsets and the periods are different as described above, a terminal may monitor all the search space set #1, the search space set #2, and the search space set #3 in a particular slot, may monitor two search space sets among the search space sets in a particular slot, and may monitor one of the search space set #1, the search space set #2, and the search space set #3 in a particular slot. Also, in FIG. 6, the terminal may receive a configuration of OFDM symbols in which a search space set required to be monitored in one slot 620 is positioned, and FIG. 6 illustrates an example in which a search space set is located on every 2 OFDM symbols.

In case that a plurality of search space sets are configured for a terminal, a search space set which the terminal is required to monitor may be determined in consideration of the following conditions.

[Condition 1: Limit on the Maximum Number of PDCCH Candidate Groups]

The number of PDCCH candidate groups that can be monitored for each slot does not exceed M. M may be defined to be the maximum number of PDCCH candidate groups for each slot in a cell configured to have a subcarrier spacing of $15 \cdot 2^\mu$ kHz, and may be defined as in table 10 below.

TABLE 10

| $\mu$ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Limit on the Maximum Number of CCEs]

The number of CCEs configuring the entire search space (wherein the entire search space means a set of all the CCEs corresponding to the union area of a plurality of search space sets) for each slot does not exceed $C^\mu$. $C^\mu$ may be defined to be the maximum number of CCEs for each slot in a cell configured to have a subcarrier spacing of $15 \cdot 2^\mu$ kHz, and may be defined as in table 11 below.

TABLE 11

| $\mu$ | Maximum number of CCEs per slot and per serving cell ($C^\mu$) |
| --- | --- |
| 0 | 56 |
| 1 | 56 |
| 2 | 48 |
| 3 | 32 |

For convenience of description, a situation where both conditions 1 and 2 are satisfied at a particular time point is defined to be "condition A". Therefore, in case that condition A is not satisfied, at least one of conditions 1 and 2 is not satisfied.

According to configurations of search space sets of a base station, condition A described above may not be satisfied at the particular time point. In case that condition A described above is not satisfied at a particular time point, a terminal may select and monitor only a part of search space sets configured to satisfy condition A at the particular time point, and the base station may transmit PDCCH on a selected search space set.

Only a part of search spaces may be selected among all the configured search space sets according to the following methods.

[Method 1]

In case that condition A for a PDCCH is not satisfied at a particular time point (slot), The terminal (or the base station) may select a search space set, among the search space sets existing at the corresponding time point, configured to have the type of a common search space, in preference to a search space set configured as a UE-specific search space.

In case that all the search space sets configured as common search spaces are selected (that is, condition A is not satisfied even after all the search spaces configured as common search spaces are selected), the terminal (or the base station) may select search space sets configured as UE-specific search spaces. In case that the number of the search space sets configured as UE-specific search spaces are plural, a search space set having a low search space set index may have higher priority. In consideration of priority, UE-specific search space sets may be selected within a range of satisfying condition A.

In a 5G communication system, in order to reduce the power consumption of a terminal, a method of controlling, by using layer 1 (L1) signaling, whether to monitor a downlink control channel (physical downlink control channel (PDCCH)) has been discussed. L1 signaling described above may include a signal (named a wake-up signal (WUS)) indicating a terminal to monitor a PDCCH, a signal (named a go-to-sleep signal (GTS)) indicating the terminal not to monitor the PDCCH, or the like. For example, a base station may transmit a WUS to a terminal, and the terminal may monitor a PDCCH from a time point at which the terminal detects the WUS. For another example, a base station may transmit a GTS to a terminal, and the terminal may not monitor a PDCCH for a particular time interval from a time point at which the terminal detects the GTS.

Various embodiments provide a method in which, when a particular condition is satisfied regardless of PDSCH reception of a terminal on the basis of various capabilities of the terminal independently from a low-power mode indicator such as a WUS or a GTS, the terminal stops PDCCH blind decoding to prevent the power consumption of the terminal due to the PDCCH blind decoding.

Various embodiments provide a PDCCH monitoring method for a terminal in consideration of PDSCH reception capability, RNTI reception capability, and PDCCH storage capability (PDCCH buffering capability) as described below. The following embodiments will be described, for example, with DCI format 1_1 as a specific DCI format for convenience of explanation. However, the scope of various embodiments is not limited to DCI format 1_1. The scope of the disclosure may be applied to all the DCI formats in which the number of times of PDCCH monitoring/decoding can be controlled according to the PDSCH reception capability, the RNTI reception capability, and the PDCCH buffering capability.

Also, in the following description, for convenience of explanation, a first embodiment, a second embodiment, and a third embodiment are divided, but can be carried out independently and in combination. For example, an operation of monitoring a PDCCH through the combination of at least two capabilities among PDSCH reception capability, RNTI reception capability, and PDCCH buffering capability may also be included in the scope of the disclosure.

In an embodiment, receiving a PDCCH may be interpreted such that DCI is monitored, decoded, or received on the PDCCH, and receiving a PDSCH may be interpreted such that data scheduled through DCI is decoded or received on the PDSCH.

First, the PDSCH reception capability of a terminal will be described.

The PDSCH reception capability is defined by how many unicast PDSCHs the terminal can receive in one slot.

The PDSCH reception capability is also related to how often the terminal can decode a PDCCH monitoring occasion in one slot, that is, an OFDM symbol period in one slot, by which the terminal can decode a PDCCH monitoring occasion. Table 12 below shows the capability of a terminal with respect to a PDCCH monitoring occasion in one slot.

TABLE 12

| # | Feature group | Note |
|---|---|---|
| 3-5 | For type 1 CSS with dedicated RRC configuration, type 3 CSS, and UE-SS, monitoring occasion can be any OFDM symbol(s) of a slot for Case 2 | |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions for a same UE as 2OFDM symbols for 15 kHz 4OFDM symbols for 30 kHz 7OFDM symbols for 60 kHz with NCP 14OFDM symbols for 120 kHz In addition to TDD, the minimum separation between the first two UL unicast DCIs in the first monitoring occasion within the first 3 OFDM symbols of a slot can be zero OFDM symbols. |

Therefore, terminals reporting, through a higher signal and to a base station, a capability such as an OFDM symbol period (e.g. the period of two OFDM symbols at 15 KHz) of a PDCCH monitoring occasion according to each subcarrier spacing in row #3-5a in table 12 may receive, from the base station, higher information relating to an OFDM symbol in one slot, in which a PDCCH is required to be monitored, as described with reference to reference numeral 620 in FIG. 6.

Tables 13 and 14 show the capability of a terminal, relating to how many PDSCHs the terminal can receive in one slot.

TABLE 13

| # | Feature group | Note |
|---|---|---|
| 5-11 | Up to 2 unicast PDSCHs per slot for different TBs for UE processing time Capability 1 | Up to 2 unicast PDSCHs per slot only in TDM is supported for Capability 1 |
| 5-11a | Up to 7 unicast PDSCHs per slot for different TBs for UE processing time Capability 1 | Up to 7 unicast PDSCHs per slot only in TDM is supported for Capability 1 |

TABLE 13-continued

| # | Feature group | Note |
|---|---|---|
| 5-11b | Up to 4 unicast PDSCHs per slot for different TBs for UE processing time Capability 1 | Up to 4 unicast PDSCHs per slot only in TDM is supported for Capability 1 |

TABLE 14

| # | Feature group | Note |
|---|---|---|
| 9 [5-13] | Up to 2 unicast PDSCHs per slot for different TBs for UE processing time Capability 2 | Up to 2 unicast PDSCHs per slot only in TDM is supported for Capability 2 |
| 10 [5-13a] | Up to 7 unicast PDSCHs per slot for different TBs for UE processing time Capability 2 | Up to 7 unicast PDSCHs per slot only in TDM is supported for Capability 2 |
| 11 [5-13c] | Up to 4 unicast PDSCHs per slot for different TBs for UE processing time Capability 2 | Up to 4 unicast PDSCHs per slot only in TDM is supported for Capability 2 |

Terminals reporting a capability of receiving two unicast PDSCHs for each slot, as shown in row #5-11 in table 13, may receive two unicast PDSCHs in one slot from a base station.

A first embodiment in which, in case that a particular condition is satisfied during PDCCH monitoring of a terminal, based on the capability described above, PDCCH decoding is stopped to reduce the power consumption of the terminal will be described with reference to FIG. 7.

Figure 7:
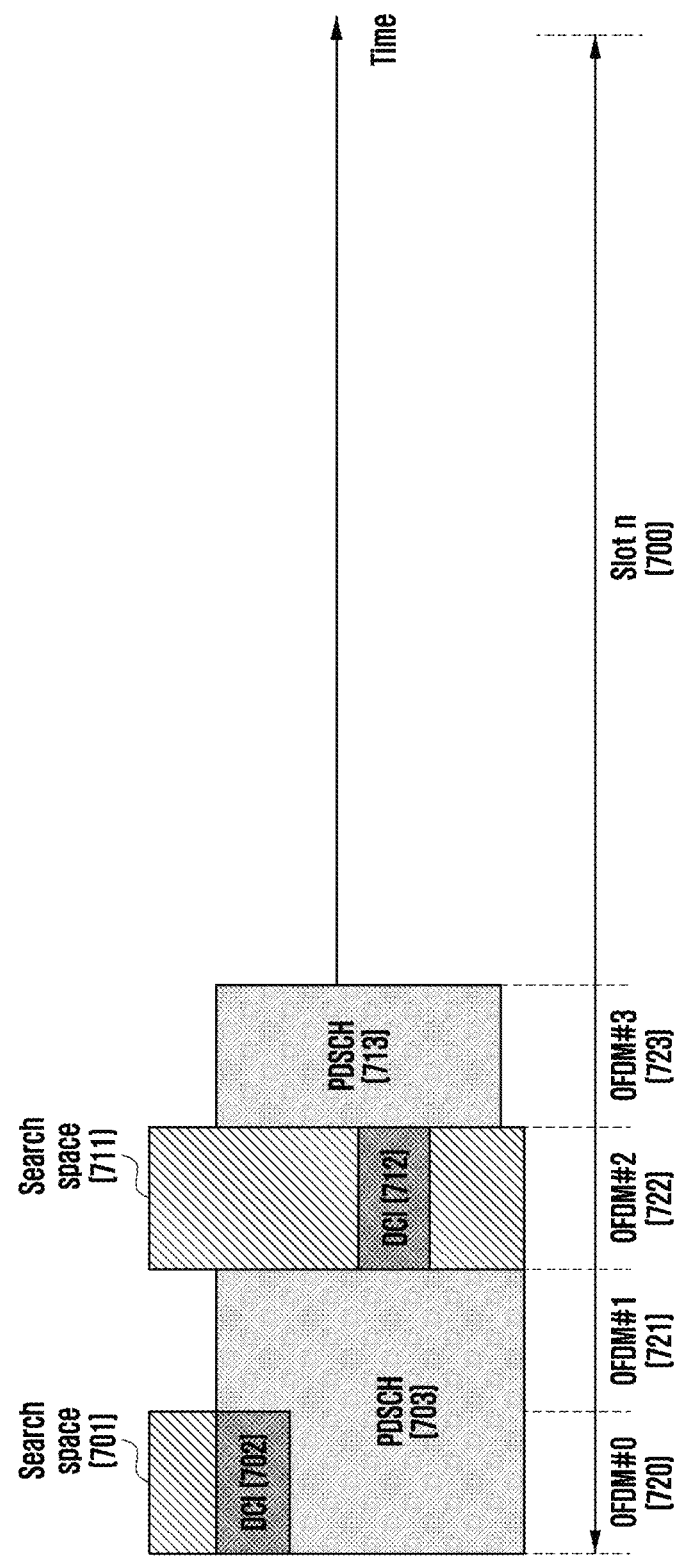
FIG. 7 illustrates a PDCCH decoding method for a terminal according to a first embodiment.

FIG. 7 illustrates a PDCCH decoding method for a terminal according to the first embodiment.

FIG. 7 illustrates scheduling of a PDSCH in one slot by a PDCCH, that is, DCI. A terminal reporting capabilities of row #3-5a of table 12 and row #5-11 of table 13 may monitor a PDCCH on every two OFDM symbols at a subcarrier spacing of 15 KHz, and may receive two unicast PDSCHs in one slot. In case that the terminal receives, from a base station, higher information indicating the terminal to monitor a PDCCH on every two OFDM symbols in one slot, the terminal is required to monitor the PDCCH on every two OFDM symbols, such as OFDM symbol #0 720 and OFDM symbol #2 722 illustrated in FIG. 7. In addition, in case that the base station configures, for the terminal, all the KOs (the number of slots from a PDCCH reception slot to a PDSCH reception slot) to be 0, the terminal determines that a PDSCH can be received in a slot receiving a PDCCH.

In case that the terminal monitors a search area 701 on OFDM symbol #0 720 illustrated in FIG. 7 to receive DCI 702 and then receive a PDSCH 703 according to the scheduling of the DCI 702, and monitors a search area 711 on OFDM symbol #2 722 to receive DCI 712 and then receive a PDSCH 713 according to the scheduling of the DCI 712, the terminal determines that the terminal has completed unicast PDSCH reception according to capability reporting in row #5-11, and is not required to perform PDCCH monitoring for unicast PDSCH reception in slot n 700 anymore. In this case, the terminal may stop monitoring for a specific DCI format. For example, the terminal may stop monitoring DCI format 1_1 corresponding to a unicast PDSCH. In case that the terminal determines that the terminal has received only a part of unicast PDSCHs, the number of which is proposed according to the capability in #5-11, the terminal continues to monitor DCI format 1_1.

In case that a terminal completes PDSCH reception according to the capability through a terminal procedure described above, the terminal stops PDCCH monitoring for unicast PDSCH reception, so that it is possible to reduce the wasted power consumption of the terminal, required for the monitoring.

Figure 8:
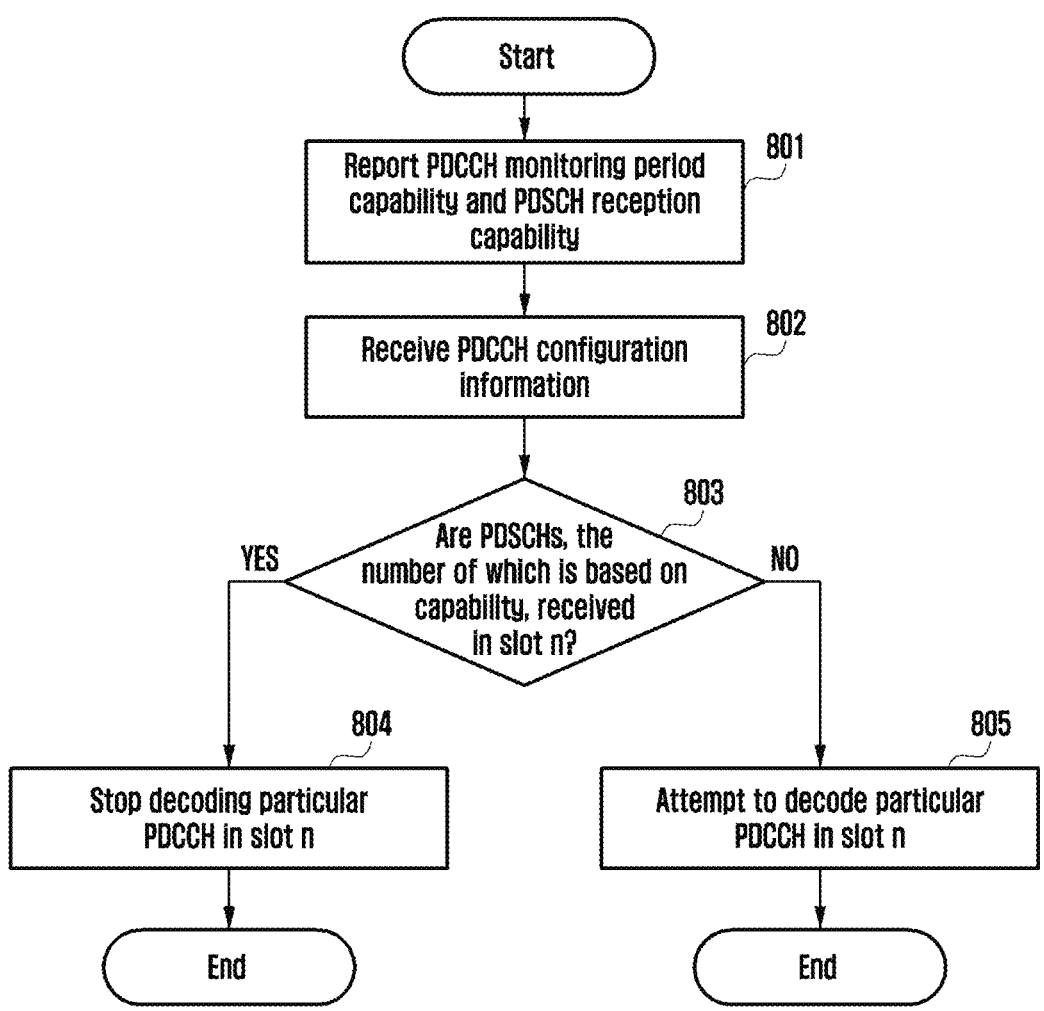
FIG. 8 illustrates a flowchart of a terminal procedure according to the first embodiment.

FIG. 8 illustrates a flowchart of a terminal procedure according to the first embodiment.

In operation 801, a terminal may report, to a base station, at least one of the capability relating to a PDCCH monitoring period and the capability relating to PDSCH reception, which have been discussed with reference to FIG. 7. At least one of the capabilities may be transmitted to the base station after being included in a terminal capability reporting message. In case that the base station has already known information, which is transmitted by the terminal through operation 801, operation 801 can be omitted. In operation 802, the terminal receives configuration information of a PDCCH. The configuration information of the PDCCH may include at least one of various information configured for the terminal to receive the PDCCH by the base station, as described above according to the disclosure. In the following other embodiments, PDCCH configuration information may also be interpreted in the same way. That is, in case that the base station transmits, to the terminal, configuration information of a PDCCH on the basis of a capability reported by the terminal in operation 801, the terminal receives the configuration information and performs PDCCH monitoring, based on the configuration information.

In operation 803, the terminal attempts to receive, in slot n, PDSCHs, the number of which is based on the capability. The terminal determines whether PDSCHs, the number of which is based on the capability, have been received in slot n. Receiving a PDSCH may be interpreted such that data is received through a PDSCH. In operation 803, in case that the reception of PDSCHs, the number of which is based on the capability, is completed, the terminal may stop decoding a specific DCI format in slot n in operation 804. For example, the terminal stops decoding, in slot n, DCI format 1_1 corresponding to a unicast PDCCH. For example, in case that the terminal operates according to configuration information of a PDCCH, the terminal is required to monitor the PDCCH according to a pre-configured symbol unit (e.g. PDCCH monitoring period). However, in case that a determination result in operation 803 shows that a pre-determined number-of-PDSCHs reception condition is satisfied, the terminal may stop PDCCH monitoring for a specific DCI format regardless of the configuration information of the PDCCH. In case that the terminal fails to complete receiving, in slot n, PDSCHs, the number of which is based on the capability, in operation 803, the terminal continues to decode, in slot n, DCI format 1_1 corresponding to a unicast PDCCH, in operation 805. In case that the terminal additionally performs DCI monitoring for the specific format, based on PDCCH configuration information such as a PDCCH monitoring period, in operation 805, and completes receiving PDSCHs, the number of which is based on the capability, the terminal may stop monitoring for the specific DCI format.

The operation may be performed according to DCI formats in the units of slots. That, in case that the operation has been performed with respect to a first DCI format, the same operation may be performed with respect to a second DCI format. Even in case that the condition is satisfied with respect to the first DCI format and thus the terminal stops monitoring for the first DCI format in the slot, the terminal may perform DCI monitoring for the second DCI format.

Next, a second embodiment in which in case that a particular condition is satisfied according to a reception capability with respect to an RNTI during PDCCH monitoring of a terminal, the terminal stops PDCCH decoding to reduce the power consumption of the terminal will be described with reference to FIG. 9.

First, reception capability with respect to an RNTI will be described.

A terminal can perform PDCCH monitoring on a plurality of RNTIs in one PDCCH monitoring occasion, and the types and the number of the above RNTIs which can be monitored may be defined for the terminal by a protocol.

In table 15, the definitions of reception types of RNTIs are listed in table 15 below. In table 16, the types and the number of PDCCHs according to RNTIs which can be simultaneously received in one PDCCH monitoring occasion are defined according to whether a terminal is in an IDLE state, an RRC-INACTIVE state, or an RRC_CONNECTED state, and whether a cell is a Pcell, a PScell, or a Scell.

As shown in table 16, in one PDCCH monitoring occasion, a terminal may receive one DCI having DCI format 1_1 scrambled by a C-RNTI scheduling a DL-SCH.

With reference to tables 15 and 16, the second embodiment will be proposed based on the number of DCI which has DCI format 1_1 scrambled by a C-RNTI and which a terminal can receive in one PDCCH monitoring occasion.

TABLE 15

| "Reception Type" | Physical Channel(s) | Monitored RNTI | Associated Transport Channel | Comment |
| --- | --- | --- | --- | --- |
| A | PBCH | N/A | BCH | |
| B | PDCCH + PDSCH | SI-RNTI (DCI format 1_0) | DL-SCH | Note 1 |
| C0 | PDCCH | P-RNTI (DCI format 1_0) | N/A | Note 2 |
| C1 | PDCCH + PDSCH | P-RNTI (DCI format 1_0) | PCH | Note 1 |
| D0 | PDCCH + PDSCH | RA-RNTI or Temporary C-RNTI (DCI format 1_0) | DL-SCH | Note 1 |
| D1 | PDCCH + PDSCH | C-RNTI, CS-RNTI, [new RNTI] (DCI format 1_1) | DL-SCH | |
| E | PDCCH | C-RNTI (DCI format 1_0) | N/A | Note 3 |
| F | PDCCH | C-RNTI, CS-RNTI, [new RNTI] (DCI format 0_1) | UL-SCH | |
| G | PDCCH | SFI-RNTI (DCI format 2_0) | N/A | |
| H | PDCCH | INT-RNTI (DCI format 2_1) | N/A | |
| J0 | PDCCH | TPC-PUSCH-RNTI (DCI format 2_2_ | N/A | |
| J1 | PDCCH | TPC-PUCCH-RNTI (DCI format 2_2) | N/A | |
| J2 | PDCCH | TPC-SRS-RNTI (DCI format 2_3) | N/A | |
| K | PDCCH | SP-CSI-RNTI (DCI format 0_1) | N/A | |

Note 1:
These are received from PCell only.
Note 2:
In some cases UE is only required to monitor the short message within the DCI for P-RNTI.
Note 3:
This corresponds to PDCCH-ordered PRACH.

TABLE 16

| UE capability | Supported Combinations | | | |
|---|---|---|---|---|
| | PCell | PSCell | SCell | Comment |
| 1. RRC_IDLE | | | | |
| | A + (B and/or C1 and/or D0) | | | Note 1 |
| 2. RRC_INACTIVE | | | | |
| | A + B + C1 + D0 | | | |
| 3. RRC_CONNECTED | | | | |
| | A + C0 + (B and/or (D0 or D1) + E + F + G + H + J0 + J1 + J2 + K | A + C0 + (B and/or (D0 or D1)) + E + F + G + H + J0 + J1 + J2 + K | D1 + F + G + H + J0 + J1 + J2 + K | Note 2 |

Note 1:
UE is not required to decode more than two PDSCH simultaneously, and decoding prioritization when more than two are received is up to UE implementation.
Note 2:
UE is not required to decode SI-RNTI PDSCH simultaneously with C-RNTI PDSCH, unless in FR1.

Figure 9:
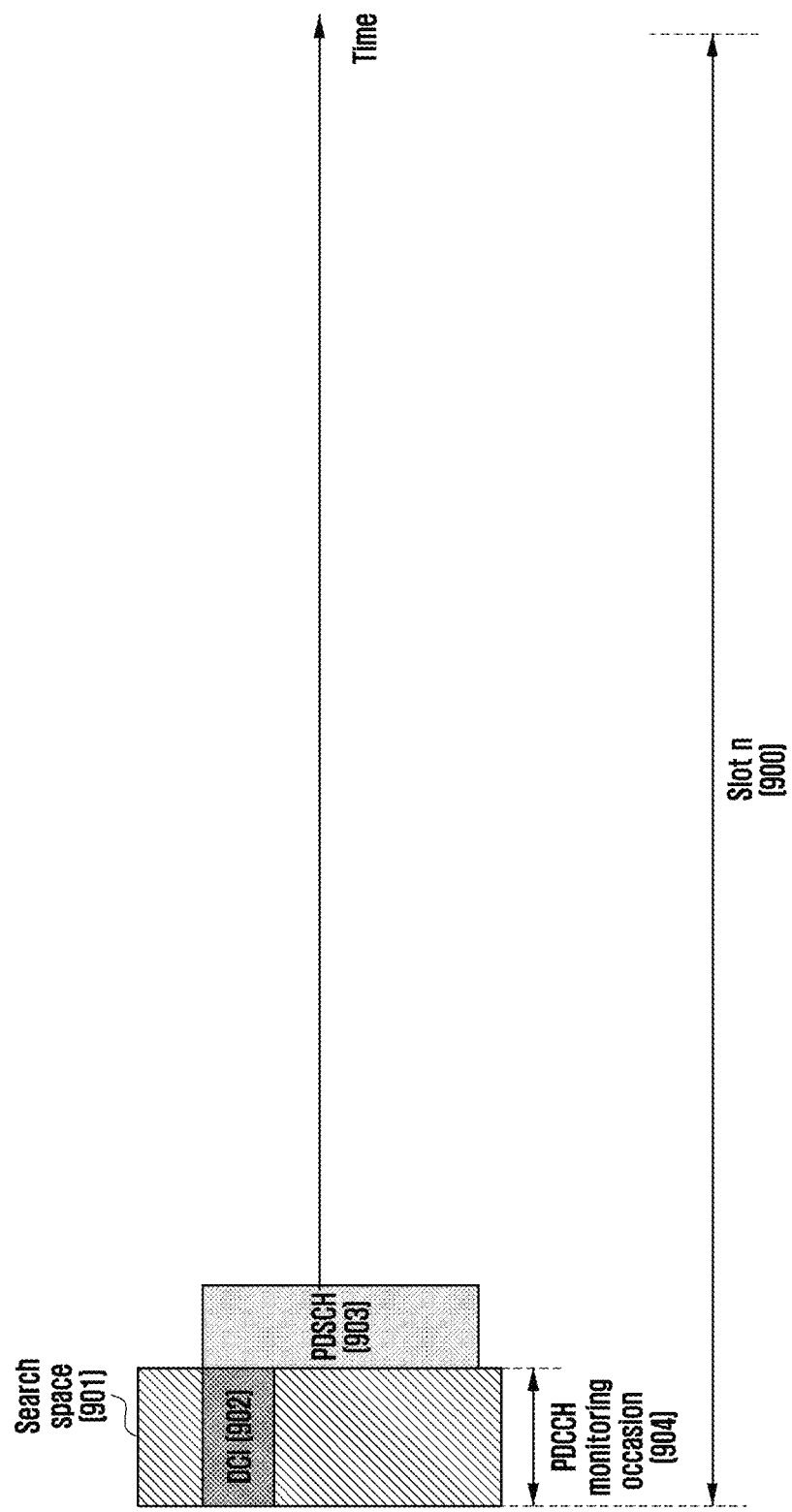
FIG. 9 illustrates a PDCCH decoding method for a terminal according to a second embodiment.

FIG. 9 illustrates a PDCCH decoding method for a terminal according to the second embodiment.

FIG. 9 illustrates scheduling of a PDSCH in one PDCCH monitoring occasion by a PDCCH, that is, DCI. According to tables 15 and 16, a terminal may perform PDCCH monitoring according to RNTIs, the types and number of which are different depending on whether the terminal is in an IDLE state, an RRC-INACTIVE state, or an RRC_CO-NNECTED state, and whether a cell is a Pcell, a PScell, or a Scell.

For example, in case that the terminal is in an RRC_CO-NNECTED state, a PDCCH configuration for monitoring a PDCCH for a Scell is configured for the terminal. The terminal may monitor a search area 901 of a PDCCH monitoring occasion 904 for the Scell to receive DCI 902 and then receive a PDSCH 903 according to the scheduling of the DCI 902. In case that the terminal has received the PDSCH, the terminal determines that the reception of a unicast PDSCH scrambled by a C-RNTI is completed, according to tables 15 and 16, and the terminal is not required to perform PDCCH monitoring for unicast PDSCH reception in the PDCCH monitoring occasion 904 anymore. Therefore, the terminal may stop monitoring DCI format 1_1 corresponding to another unicast PDSCH in the PDCCH monitoring occasion 904. In case that it is determined that the terminal has received only a part of unicast PDSCHs scrambled by a C-RNTI, according to tables 15 and 16, the terminal continues to monitor DCI format 1_1. In the above description, DCI format 1_1 scrambled by a C-RNTI is exemplified, but the scope of embodiments is not limited thereto. In case that the number of DCI formats scrambled by another type of RNTI in one PDCCH monitoring occasion 904 is satisfied according to tables 15 and 16 (in case that DCI, which can be scrambled by the corresponding type of RNTI, are received), the terminal is not required to perform PDCCH monitoring for the DCI formats scrambled by the corresponding type of RNTI. In case that a terminal completes DCI format reception according to the RNTI reception capability through a terminal procedure described above, the terminal stops PDCCH monitoring corresponding to a corresponding DCI format, so that it is possible to reduce the wasted power consumption of the terminal, required for the monitoring.

Figure 10:
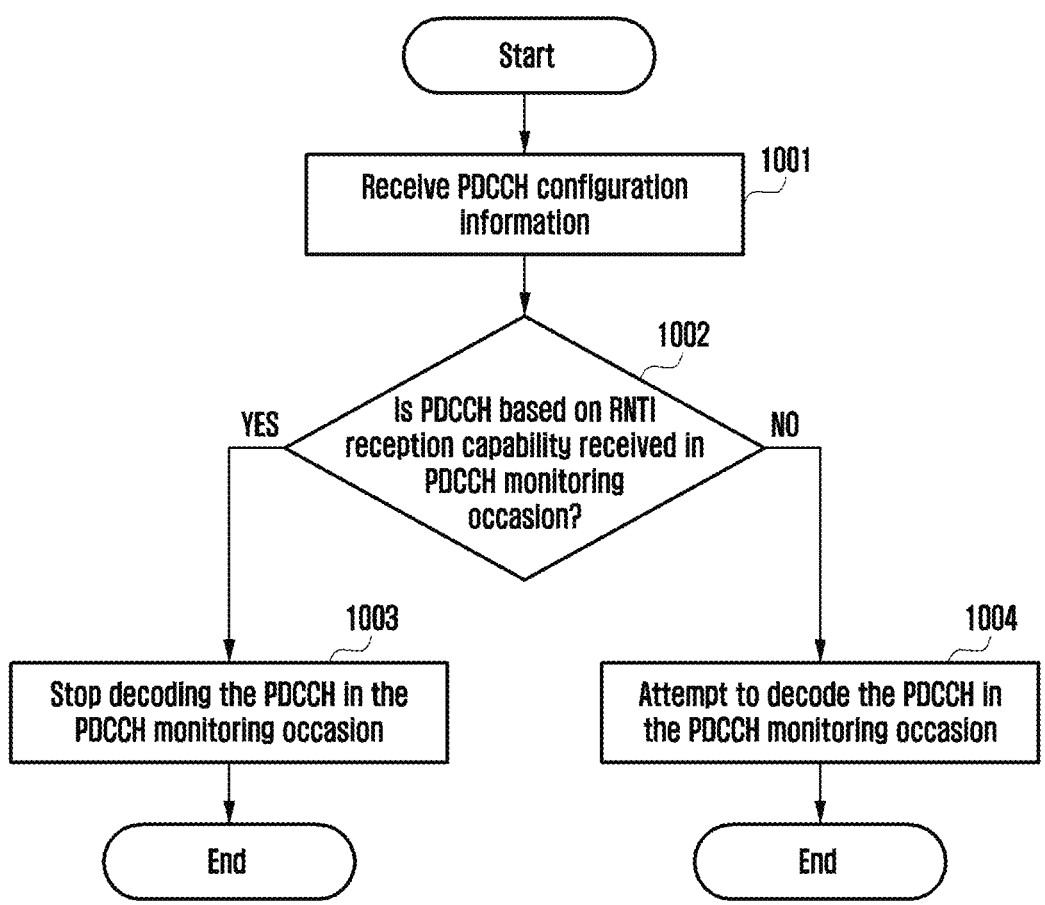
FIG. 10 illustrates a terminal procedure according to the second embodiment.

FIG. 10 illustrates a terminal procedure according to the second embodiment.

In operation 1001, a terminal receives configuration information of a PDCCH. That is, a base station transmits, to the terminal, configuration information of a PDCCH according to whether the terminal is in an IDLE state, an RRC-INACTIVE state, or an RRC_CONNECTED state, and whether a cell that is to transmit the PDCCH to the terminal is a Pcell, a PScell, or a Scell. The terminal receives the configuration information and performs PDCCH monitoring, based on the configuration information.

In operation 1002, the terminal receives, in one PDCCH monitoring occasion, PDCCHs, the number of which is based on the RNTI reception capability, as illustrated in FIG. 9. The terminal determines whether PDCCHs, the number of which is based on the RNTI reception capability, have been received in one PDCCH monitoring occasion in operation 1002. Receiving a PDCCH may be interpreted such that DCI is received through the PDCCH. In case that the reception of PDCCHs, the number of which is based on the RNTI reception capability is completed in operation 1002, the terminal stops decoding the PDCCH in the PDCCH monitoring occasion in operation 1003. For example, in case that the terminal has completed the reception of PDCCHs, the number of which is based on a C-RNTI, the terminal may stop PDCCH monitoring for DCI formats scrambled by a C-RNTI, in a corresponding PDCCH monitoring occasion. For example, there may be a plurality of PDCCH candidates in a corresponding PDCCH monitoring occasion of a search space, but in case that the reception of PDCCHs scrambled by RNTIs, the number of which is based on RNTI reception capability, is completed in the corresponding PDCCH monitoring occasion, the terminal may stop monitoring a PDCCH scrambled by a corresponding type of RNTI, with respect to the remaining PDCCH candidates of the corresponding PDCCH monitoring occasion. That is, in case that the PDCCH monitoring occasion corresponds to a time domain, the terminal may stop monitoring a PDCCH scrambled by the corresponding type of RNTI, in another frequency area in the time domain. Therefore, the terminal may monitor only PDCCHs scrambled by the remaining other types of RNTIs within the RNTI reception capability, except for the type of RNTIs already received in the PDCCH monitoring occasion, so that the power consumption required for monitoring a PDCCH corresponding to the type of RNTIs that have been received and thus excluded can be prevented. In case that the reception of PDCCHs, the number of which is based on the RNTI reception capability, fails to be completed in operation 1002, the terminal continues to decode a PDCCH in the PDCCH monitoring occasion in operation 1004. In case that the terminal continues to decode the PDCCH and then has completed the reception of PDCCHs, the number of which is based on the RNTI reception capability, the terminal stops decoding the PDCCH in the PDCCH monitoring occasion.

The operation may be performed according to DCI formats in the units of PDCCH monitoring occasions. That, in case that the operation has been performed with respect to a first RNTI, the same operation may be performed with respect to a second RNTI. Even in case that the condition is satisfied with respect to the first RNTI and thus the terminal stops, in the slot, monitoring for DCI scrambled by the first RNTI, the terminal may perform monitoring for DCI scrambled by the second RNTI.

Next, a third embodiment in which in case that a particular condition is satisfied based on the PDCCH buffering capability of a terminal capable of storing PDCCHs, during PDCCH monitoring of the terminal, the terminal stops PDCCH decoding to reduce the power consumption of the terminal will be described with reference to FIG. 11.

PDCCH buffering capability indicating how many PDCCHs a terminal can store therein will be described first. In 5G (NR) technology, a protocol is defined such that a terminal is not required to store PDCCHs, the number of which is more than 16, the PDCCHs scheduling unicast PDSCHs received up to slot n in a cell. Therefore, the third embodiment will be proposed based on PDCCH buffering capability described above.

Figure 11:
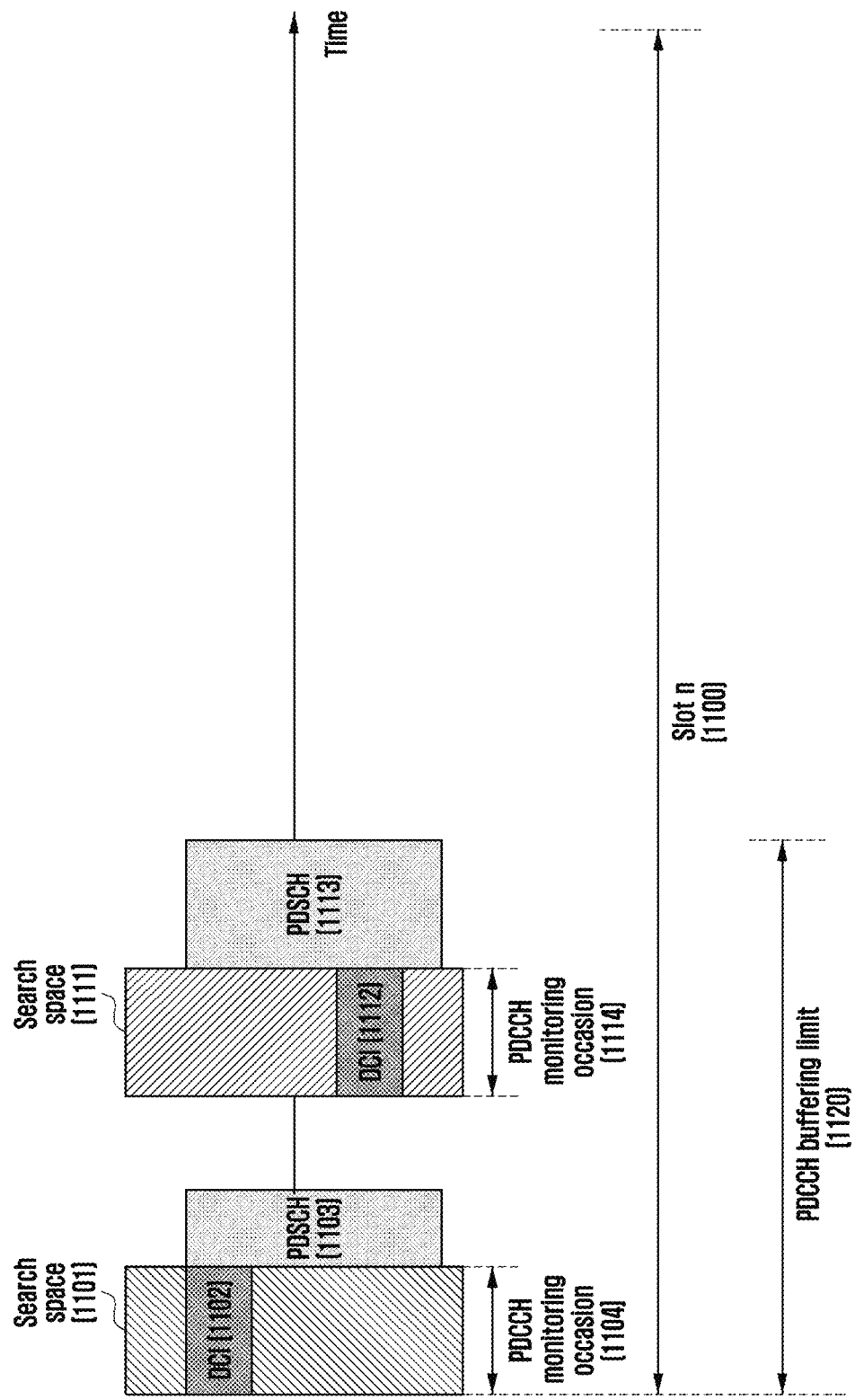
FIG. 11 illustrates a PDCCH decoding method for a terminal according to a third embodiment.

FIG. 11 illustrates a PDCCH decoding method for a terminal according to the third embodiment.

FIG. 11 illustrates scheduling of a PDSCH in slot n 1100 by a PDCCH, that is, DCI. The terminal monitors a search area 1101 of a PDCCH monitoring occasion 1104 to receive DCI 1102 and then receive a PDSCH 1103 according to the scheduling of the DCI 1102. Also, the terminal monitors a search area 1111 of a PDCCH monitoring occasion 1114 to receive DCI 1112 and then receive a PDSCH 1113 according to the scheduling of the DCI 1112. In case that the terminal determines that the terminal is not able to store PDCCHs anymore according to a PDCCH buffering capability (or limit) 1120, the terminal is not required to perform PDCCH monitoring for PDSCH reception any longer. Therefore, the terminal may stop monitoring DCI format 1_0 and DCI format 1_1 scrambled by a C-RNTI, a CS-RNTI, and a MCS-RNTI for scheduling the PDSCH. In case that the terminal determines that the terminal has received only a part of PDCCHs, the number of which is based on the PDCCH buffering capability, the terminal continues to monitor DCI format 1_0 and DCI format 1_1 scrambled by a C-RNTI, a CS-RNTI, and a MCS-RNTI for scheduling the PDSCH. In case that a terminal completes PDCCH reception according to the capability through a terminal procedure described above, the terminal stops monitoring a corresponding PDCCH, so that it is possible to reduce the wasted power consumption of the terminal, required for the monitoring.

Figure 12:
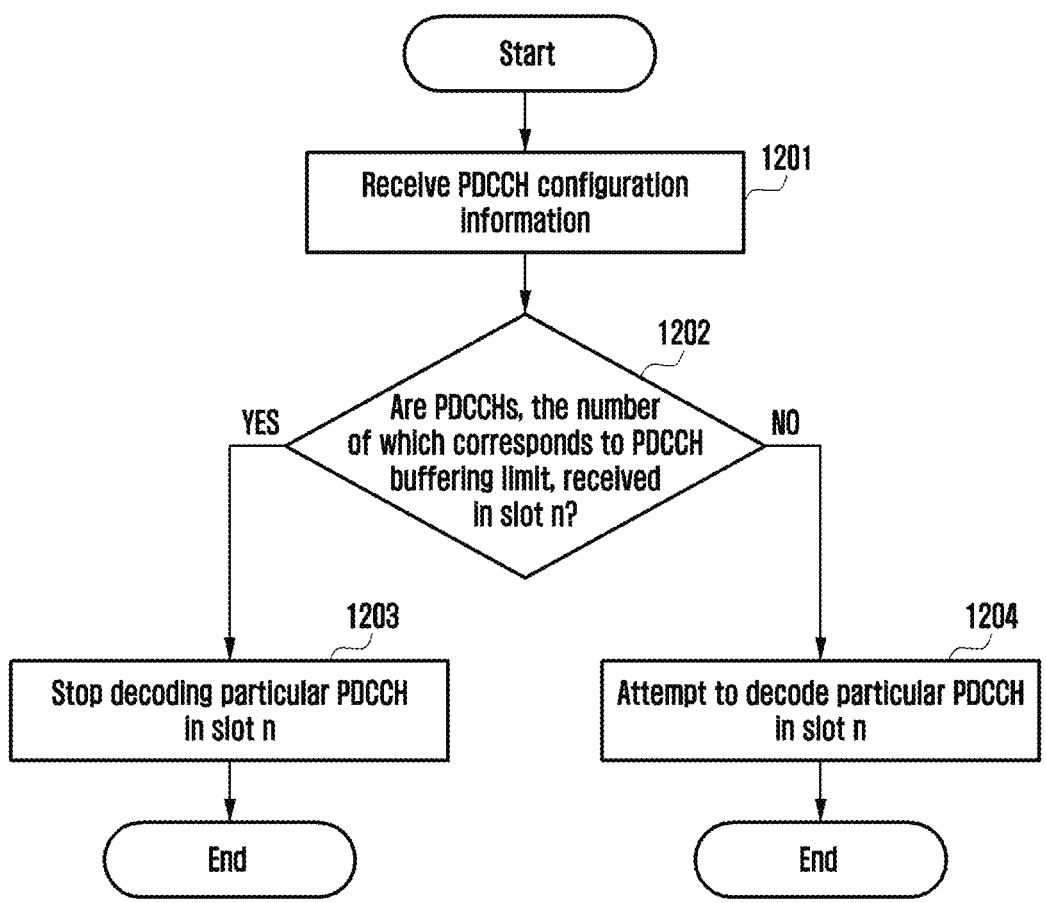
FIG. 12 illustrates a terminal procedure according to the third embodiment.

FIG. 12 illustrates a terminal procedure according to the third embodiment.

In operation 1201, a terminal receives configuration information of a PDCCH. That is, in case that a base station transmits configuration information of a PDCCH to the terminal, the terminal receives the configuration information and performs PDCCH monitoring, based on the configuration information.

In operation 1202, the terminal receives, in slot n, PDCCHs, the number of which is based on the capability corresponding to a PDCCH buffering limit. Receiving a PDCCH may be interpreted such that DCI is received through the PDCCH. In operation 1202, the terminal may determine whether PDCCHs, the number of which corresponds to the PDCCH buffering limit, are received in slot n. In case that a determination result indicates that the terminal has received the corresponding number of PDCCHs, the terminal may proceed to operation 1203, and otherwise, the terminal may proceed to operation 1204. In case that the reception of PDCCHs, the number of which corresponds to the PDCCH buffering limit, is completed in slot n, the terminal stops decoding, in slot n, DCI format 1_0 and DCI format 1_1 scrambled by a C-RNTI, a CS-RNTI, and a MCS-RNTI, in operation 1203. In case that the reception of PDCCHs, the number of which corresponds to the PDCCH buffering limit, is not completed in slot n, the terminal continues to decode, in slot n, DCI format 1_0 and DCI format 1_1 scrambled by a C-RNTI, a CS-RNTI, and a MCS-RNTI, in operation 1204. In case that the reception of PDCCHs, the number of which corresponds to the PDCCH buffering limit, is completed in slot n according to the additional DCI format decoding, the terminal may stop decoding, in slot n, DCI format 1_0 and DCI format 1_1 scrambled by a C-RNTI, a CS-RNTI, and a MCS-RNTI, so as to prevent the wasting of power consumption.

Figure 13:
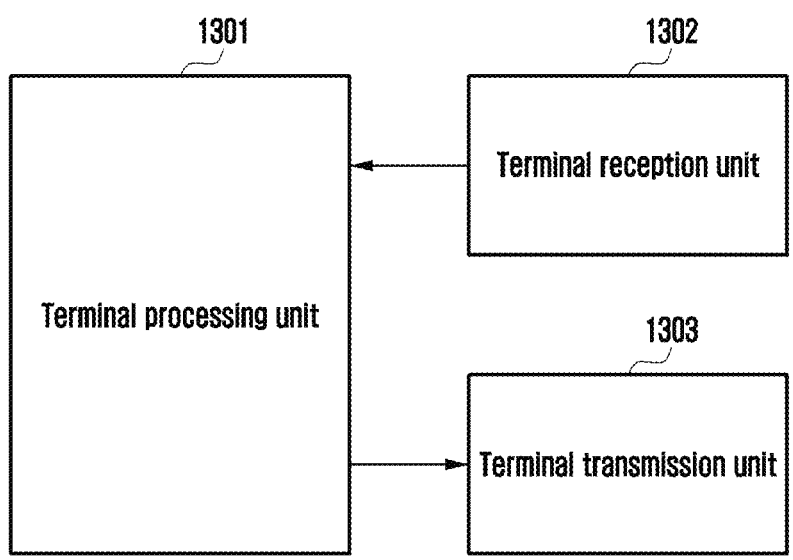
FIG. 13 illustrates a block diagram showing a configuration of a terminal according to an embodiment.
Figure 14:
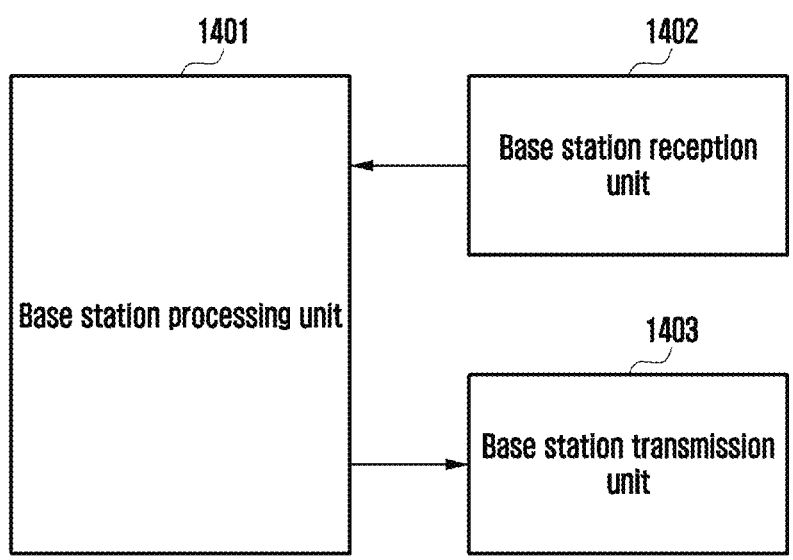
FIG. 14 illustrates a block diagram of a configuration of a base station according to an embodiment.

A transmission unit, a reception unit, and a control unit of a terminal and a transmission unit, a reception unit, and a control unit of a base station are illustrated in FIGS. 13 and 14, respectively, in order to perform the embodiments. The disclosure provides a transmission/reception method for a base station and a terminal, which is designed for applying a method for transmitting or receiving a downlink control channel and downlink control information in a 5G communication system corresponding to the embodiments, and in order to perform the transmission/reception method, transmission units, reception units, and control units of a terminal and a base station are required to operate according to each embodiment.

Specifically, FIG. 13 illustrates a block diagram of a configuration of a terminal according to an embodiment. As shown in FIG. 13, a terminal of the disclosure may include a terminal processing unit 1301, a terminal reception unit 1302, and a terminal transmission unit 1303.

The terminal processing unit 1301 may control a series of procedures in which the terminal may operate according to the embodiments described above. For example, the terminal processing unit 1301 may differently control a terminal capability reporting operation, a PDCCH monitoring operation according to the reporting operation, and the like according to an embodiment. The terminal processing unit 1301 may be called a control unit or a controller. Also, the terminal processing unit 1301 may include at least one processor.

The terminal processing unit 1301 may control the terminal to: receive configuration information of a physical downlink control channel (PDCCH) from a base station; monitor downlink control information (DCI) having a specific format in a slot, the monitoring based on the configuration information of the PDCCH; determine whether a number of physical downlink shared channels (PDSCHs) received based on the DCI having the specific format in the slot is a number based on a PDSCH reception capability of the terminal; and in case that the number of the PDSCHs received based on the DCI having the specific format is the number based on the PDSCH reception capability of the terminal, stop monitoring DCI having the specific format in the slot. In addition, the terminal processing unit 1301 may control the terminal to, in case that the number of the PDSCHs received based on the DCI having the specific format in the slot is smaller than the number based on the PDSCH reception capability of the terminal, monitor DCI having the specific format, based on a PDCCH monitoring period included in the configuration information of the PDCCH. The DCI having the specific format may include DCI format 1_1.

In addition, the terminal processing unit 1301 may control the terminal to: determine whether a number of DCI scrambled by a specific radio network temporary identifier (RNTI) and received in a PDCCH monitoring occasion is a number based on a RNTI reception capability; and in case that the number of the DCI which are scrambled by the specific RNTI and are received in the PDCCH monitoring occasion is the number based on the RNTI reception capability, stop monitoring DCI scrambled by the specific RNTI in the PDCCH monitoring occasion. In addition, the terminal processing unit 1301 may control the terminal to: in case that the number of the DCI which are scrambled by the specific RNTI and are received in the PDCCH monitoring occasion is smaller than the number based on the RNTI reception capability, monitor DCI scrambled by the RNTI, based on the configuration information of the PDCCH. The specific RNTI may include a cell-RNTI (C-RNTI), and the DCI having the specific format may include DCI format 1_1.

In addition, the terminal processing unit 1301 may control the terminal to: determine whether a number of DCI received in the slot is a number corresponding to a PDCCH buffering limit; and in case that the number of the pieces of DCI received in the slot is the number corresponding to the PDCCH buffering limit, stop monitoring DCI in the slot. The terminal processing unit 1301 may control the terminal to stop monitoring DCI format 1_0 and DCI format 1_1 scrambled by a C-RNTI, a configured scheduling-RNTI (CS-RNTI), and a modulation coding scheme-RNTI (MCS-RNTI). Also, the terminal processing unit 1301 may control the terminal to: in case that the number of the pieces of DCI received in the slot is smaller than the number corresponding to the PDCCH buffering limit, monitor DCI in the slot, based on the configuration information of the PDCCH.

The terminal reception unit 1302 and the terminal transmission unit 1303 are collectively called a transceiver in an embodiment. The transceiver may transmit or receive a signal to or from a base station. The signal may include control information and data. To this end, the transceiver may include an RF transmitter that up-converts and amplifies the frequency of a transmitted signal, an RF receiver that low-noise amplifies a received signal and down-converts the frequency, and the like. Also, the transceiver may receive a signal through a wireless channel, output the signal to the terminal processing unit 1301, and transmit a signal output from the terminal processing unit 1301, through a wireless channel.

FIG. 14 illustrates a block diagram of a configuration of a base station according to an embodiment. As shown in FIG. 14, a base station of the disclosure may include a base station processing unit 1401, a base station reception unit 1402, and a base station transmission unit 1403.

The base station processing unit 1401 may control a series of procedures such that the base station operates according to the above embodiments. For example, the base station processing unit 1401 may differently control capability reporting of a terminal, PDCCH configuration and transmission according to a capability defined in a protocol, and the like according to an embodiment. The base station processing unit 1401 may be called a control unit or a controller. Also, the base station processing unit 1401 may include at least one processor.

The base station reception unit 1402 and the base station transmission unit 1403 are collectively called a transceiver in an embodiment. The transceiver may transmit or receive a signal to or from a terminal. The signal may include control information and data. To this end, the transceiver may include an RF transmitter that up-converts and amplifies the frequency of a transmitted signal, an RF receiver that low-noise amplifies a received signal and down-converts the frequency, and the like. Also, the transceiver may receive a signal through a wireless channel, output the signal to the base station processing unit 1401, and transmit a signal output from the base station processing unit 1401, through a wireless channel.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving configuration information of a physical downlink control channel (PDCCH) from a base station;
   monitoring downlink control information (DCI) having a specific format in a slot, the monitoring based on the configuration information of the PDCCH;
   determining whether a number of physical downlink shared channels (PDSCHs) received based on the DCI having the specific format in the slot is a number based on a PDSCH reception capability of the terminal; and
   in case that the number of the PDSCHs received based on the DCI having the specific format is the number based on the PDSCH reception capability of the terminal, stopping monitoring the DCI having the specific format in the slot.

2. The method of claim 1, further comprising:
   in case that the number of the PDSCHs received based on the DCI having the specific format in the slot is smaller than the number based on the PDSCH reception capability of the terminal, monitoring the DCI having the specific format, based on a PDCCH monitoring period included in the configuration information of the PDCCH.

3. The method of claim 1, wherein the DCI having the specific format includes DCI format 1_1.

4. The method of claim 1, further comprising:
   determining whether a number of DCI scrambled by a specific radio network temporary identifier (RNTI) and received in a PDCCH monitoring occasion is a number based on an RNTI reception capability; and
   in case that the number of the DCI scrambled by the specific RNTI and received in the PDCCH monitoring occasion is the number based on the RNTI reception capability, stopping monitoring the DCI scrambled by the specific RNTI, in the PDCCH monitoring occasion.

5. The method of claim 4, further comprising:
   in case that the number of the DCI scrambled by the specific RNTI and received in the PDCCH monitoring occasion is smaller than the number based on the RNTI reception capability, monitoring the DCI scrambled by the RNTI, based on the configuration information of the PDCCH.

6. The method of claim 4, wherein the specific RNTI includes a cell-RNTI (C-RNTI), and the DCI having the specific format includes DCI format 1_1.

7. The method of claim 1, further comprising:
   determining whether a number of DCI received in the slot is a number corresponding to a PDCCH buffering limit; and
   in case that the number of the DCI received in the slot is the number corresponding to the PDCCH buffering limit, stopping monitoring the DCI in the slot.

8. The method of claim 7, further comprising:
   in case that the number of the DCI received in the slot is smaller than the number corresponding to the PDCCH buffering limit, monitoring the DCI in the slot, based on the configuration information of the PDCCH.

9. The method of claim 7, further comprising:
   stopping monitoring DCI format 1_0 and DCI format 1_1 that are scrambled by a cell-RNTI (C-RNTI), a configured scheduling-RNTI (CS-RNTI), or a modulation coding scheme-RNTI (MCS-RNTI).

10. The method of claim 1, further comprising:
transmitting terminal capability reporting information including the PDSCH reception capability of the terminal to the base station,
wherein the configuration information of the PDCCH is generated based on the terminal capability reporting information.

11. A terminal comprising:
a transceiver; and
at least one processor configured to:
receive, from a base station via the transceiver, configuration information of a physical downlink control channel (PDCCH),
monitor downlink control information (DCI) having a specific format in a slot, the monitoring based on the configuration information of the PDCCH,
determine whether a number of physical downlink shared channels (PDSCHs) received based on the DCI having the specific format in the slot is a number based on a PDSCH reception capability of the terminal, and
in case that the number of the PDSCHs received based on the DCI having the specific format is the number based on the PDSCH reception capability of the terminal, stop monitoring the DCI having the specific format in the slot.

12. The terminal of claim 11, wherein the at least one processor is further configured to:
in case that the number of the PDSCHs received based on the DCI having the specific format in the slot is smaller than the number based on the PDSCH reception capability of the terminal, monitor the DCI having the specific format, based on a PDCCH monitoring period included in the configuration information of the PDCCH.

13. The terminal of claim 11, wherein the DCI having the specific format includes DCI format 1_1.

14. The terminal of claim 11, wherein the at least one processor is further configured to:
determine whether a number of DCI scrambled by a specific radio network temporary identifier (RNTI) and received in a PDCCH monitoring occasion is a number based on an RNTI reception capability; and
in case that the number of the DCI scrambled by the specific RNTI and received in the PDCCH monitoring occasion is the number based on the RNTI reception capability, stop monitoring the DCI scrambled by the specific RNTI, in the PDCCH monitoring occasion.

15. The terminal of claim 14, wherein the at least one processor is further configured to:
in case that the number of the DCI scrambled by the specific RNTI and received in the PDCCH monitoring occasion is smaller than the number based on the RNTI reception capability, monitor the DCI scrambled by the RNTI, based on the configuration information of the PDCCH.

16. The terminal of claim 14, wherein the specific RNTI includes a cell-RNTI (C-RNTI), and the DCI having the specific format includes DCI format 1_1.

17. The terminal of claim 11, wherein the at least one processor controls the terminal to:
determine whether a number of DCI received in the slot is a number corresponding to a PDCCH buffering limit; and
in case that the number of the DCI received in the slot is the number corresponding to the PDCCH buffering limit, stop monitoring the DCI in the slot.

18. The terminal of claim 17, wherein the at least one processor is further configured to:
in case that the number of the DCI received in the slot is smaller than the number corresponding to the PDCCH buffering limit, monitor the DCI in the slot, based on the configuration information of the PDCCH.

19. The terminal of claim 17, wherein the at least one processor controls the terminal to:
stop monitoring DCI format 1_0 and DCI format 1_1 that are scrambled by a cell-RNTI (C-RNTI), a configured scheduling-RNTI (CS-RNTI), or a modulation coding scheme-RNTI (MCS-RNTI).

20. The terminal of claim 11, wherein the at least one processor controls the terminal to transmit terminal capability reporting information including the PDSCH reception capability of the terminal to the base station, and
wherein the configuration information of the PDCCH is generated based on the terminal capability reporting information.

* * * * *